(12) United States Patent
Stark et al.

(10) Patent No.: US 10,427,080 B2
(45) Date of Patent: *Oct. 1, 2019

(54) FILTER HOLDER, FILTER ELEMENT AND FILTER ARRANGEMENT

(71) Applicant: MANN+HUMMEL GMBH, Ludwigsburg (DE)

(72) Inventors: Dennis Stark, Mauer (DE); Beate Brandt, Altlussheim (DE); Manfred Winter, Bad Rappenau (DE); Duc Cuong Nguyen, Laatzen (DE); Karlheinz Muenkel, Oberderdingen-Flehingen (DE); Volker Greif, Harthausen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 387 days.

This patent is subject to a terminal disclaimer.

(21) Appl. No.: 15/095,127

(22) Filed: Apr. 10, 2016

(65) Prior Publication Data

US 2016/0296872 A1  Oct. 13, 2016

Related U.S. Application Data

(60) Provisional application No. 62/186,576, filed on Jun. 30, 2015.

(30) Foreign Application Priority Data

Apr. 10, 2015 (DE) .................. 10 2015 004 383

(51) Int. Cl.
  *B01D 46/00* (2006.01)
  *B01D 46/24* (2006.01)
  *B01D 50/00* (2006.01)

(52) U.S. Cl.
  CPC ..... *B01D 46/0046* (2013.01); *B01D 46/0005* (2013.01); *B01D 46/0024* (2013.01);
  (Continued)

(58) Field of Classification Search
  None
  See application file for complete search history.

(56) References Cited

U.S. PATENT DOCUMENTS 4,537,608 A * 8/1985 Koslow ............... B01D 50/002
                                                       55/337
5,238,474 A * 8/1993 Kahlbaugh ............ B01D 39/14
                                                       55/320

(Continued)

FOREIGN PATENT DOCUMENTS

DE 102014006850 A1 12/2014
DE 202013011865 U1 12/2014
DE 102014012943 A1 3/2015

*Primary Examiner* — Bobby Ramdhanie
*Assistant Examiner* — Brit E. Anbacht
(74) *Attorney, Agent, or Firm* — James Hasselbeck

(57) ABSTRACT

A filter holder (2) for a filter element (3) has an oval-shaped cross section, a receiving section (19) for a filter element (3), a fluid inlet (24), and a fluid outlet (25). The fluid inlet (24) is arranged such that an inflow direction (E) of the fluid (L) to be filtered is oriented in the direction of a lateral surface (29) of the filter element (3) such that the fluid (L) to be filtered flows tangentially around the filter element (3) in order to separate particles (33) contained in the fluid (L) onto a wall (30) of the receiving section (19) with the aid of centrifugal force.

8 Claims, 32 Drawing Sheets

(52) U.S. Cl.
CPC ..... *B01D 46/0045* (2013.01); *B01D 46/2414* (2013.01); *B01D 50/002* (2013.01); *B01D 2271/027* (2013.01); *B01D 2275/208* (2013.01)

(56) References Cited

U.S. PATENT DOCUMENTS

| | | | | |
|---|---|---|---|---|
| 5,893,937 A * | 4/1999 | Moessinger | ....... | B01D 46/0004 55/385.3 |
| 6,149,700 A * | 11/2000 | Morgan | ............ | B01D 46/2414 123/198 E |
| 6,416,561 B1 * | 7/2002 | Kallsen | .................. | B01D 29/21 55/482 |
| 6,511,599 B2 * | 1/2003 | Jaroszczyk | ........... | B01D 29/111 210/493.5 |
| 7,004,986 B2 * | 2/2006 | Kopec | ................ | B01D 46/0004 55/337 |
| 7,491,254 B2 * | 2/2009 | Krisko | ................... | B01D 45/12 55/337 |
| 8,016,903 B2 * | 9/2011 | Nelson | ............... | B01D 46/4227 55/357 |
| 8,157,880 B2 * | 4/2012 | Muenkel | ........... | B01D 46/0021 55/385.3 |
| 8,652,327 B2 * | 2/2014 | Lucas | .................... | B01D 29/21 210/256 |
| 8,790,431 B2 * | 7/2014 | Muenkel | ........... | B01D 46/0021 55/337 |
| 9,132,371 B2 | 9/2015 | Heim et al. | | |
| D749,641 S * | 2/2016 | Menssen | ........................ | D15/5 |
| D785,676 S * | 5/2017 | Menssen | ........... | B01D 46/0021 D15/5 |
| 9,707,503 B2 * | 7/2017 | Gieseke | ............ | B01D 46/0001 |
| 2003/0182911 A1 | 10/2003 | Schrage | ............ | B01D 46/0001 55/498 |
| 2004/0216434 A1 * | 11/2004 | Gunderson | ........ | B01D 29/21 55/498 |
| 2006/0101795 A1 * | 5/2006 | Krisko | ................... | B01D 45/12 55/337 |
| 2007/0006560 A1 * | 1/2007 | Ruhland | ............... | B01D 46/10 55/497 |
| 2007/0039296 A1 * | 2/2007 | Schrage | .......... | B01D 25/001 55/497 |
| 2007/0289265 A1 * | 12/2007 | Coulonvaux | ...... | B01D 46/0023 55/324 |
| 2008/0041026 A1 * | 2/2008 | Engel | ................ | B01D 46/2411 55/432 |
| 2009/0038276 A1 * | 2/2009 | Gunderson | ........ | B01D 46/0021 55/343 |
| 2010/0037570 A1 * | 2/2010 | Osendorf | ........... | B01D 46/0004 55/355 |
| 2010/0162673 A1 * | 7/2010 | Grosche | ............. | B01D 46/0004 55/482 |
| 2010/0186353 A1 * | 7/2010 | Ackermann | ....... | B01D 46/0021 55/321 |
| 2010/0242423 A1 * | 9/2010 | Morgan | ............. | B01D 46/0005 55/483 |
| 2011/0000458 A1 * | 1/2011 | Muenkel | ............ | B01D 46/0021 123/198 E |
| 2012/0198802 A1 * | 8/2012 | Menssen | ................ | B01D 45/16 55/337 |
| 2013/0031878 A1 * | 2/2013 | Menssen | ................ | B01D 45/16 55/345 |
| 2014/0033666 A1 * | 2/2014 | Menssen | ............ | B01D 46/2418 55/495 |
| 2014/0047808 A1 * | 2/2014 | Menssen | ............ | B01D 46/2411 55/502 |
| 2014/0165513 A1 * | 6/2014 | Oelpke | .............. | F02M 35/0216 55/385.1 |
| 2014/0208702 A1 * | 7/2014 | Lundgren | .......... | B01D 46/2414 55/357 |
| 2014/0237966 A1 * | 8/2014 | Chin | .................. | B01D 46/0005 55/483 |
| 2014/0373495 A1 * | 12/2014 | Madeira | ............. | F02M 35/0204 55/502 |
| 2015/0068169 A1 * | 3/2015 | Schulz | ................... | B01D 45/16 55/337 |
| 2016/0023137 A1 * | 1/2016 | Sorger | ............... | B01D 46/4236 |
| 2016/0101380 A1 * | 4/2016 | Pereira Madeira | .......................... | B01D 46/0041 55/503 |
| 2016/0115917 A1 * | 4/2016 | Sorger | ............... | B01D 46/0005 55/481 |
| 2016/0131094 A1 * | 5/2016 | Pereira Madeira | .......................... | F02M 35/02425 96/414 |
| 2016/0296867 A1 * | 10/2016 | Stark | ............... | F02M 35/02416 |
| 2016/0296868 A1 * | 10/2016 | Stark | ............... | B01D 46/0005 |
| 2016/0296869 A1 * | 10/2016 | Stark | ................. | F02M 35/0202 |
| 2016/0296872 A1 * | 10/2016 | Stark | ................. | B01D 46/0046 |
| 2017/0096973 A1 * | 4/2017 | Kaufmann | ........... | F02M 35/024 |
| 2017/0122270 A1 * | 5/2017 | Williams | ........... | B01D 46/0004 |
| 2017/0254301 A1 * | 9/2017 | Marcondes | ........ | B01D 46/0005 |
| 2017/0296958 A1 * | 10/2017 | Nam | .................... | A47L 9/1608 |
| 2018/0008923 A1 * | 1/2018 | Burton | .................. | B01D 45/14 |
| 2018/0050296 A1 * | 2/2018 | Fritzsching | ........ | B01D 46/2414 |

* cited by examiner

FILTER HOLDER, FILTER ELEMENT AND FILTER ARRANGEMENT

TECHNICAL FIELD

The present invention relates to a filter holder, a filter element and a filter arrangement.

BACKGROUND

Known air filters for motor vehicles can have an annularly closed, radially folded filter medium that can be wound onto a center pipe, for example. Particularly in the area of agricultural commercial vehicles and construction vehicles, the filter medium can become clogged or damaged due to the heavy dust load. This can reduce the service life and the filtration efficiency of the air filter.

WO 2009/106591 A2 describes an air filter with a pre-separator. With the aid of the pre-separator, particles contained in the raw gas can be separated off by means of centrifugal force. An increase in the filtration efficiency can be achieved in this way, since the particles are removed from the raw gas before reaching the air filter.

SUMMARY

Against this background, it is the object of the present invention to provide an improved filter holder for a filter element.

Accordingly, a filter holder for a filter element is proposed that has an oval-shaped cross section transverse to a longitudinal direction. The filter holder comprises a receiving section for receiving the filter element, a fluid inlet for allowing fluid to be filtered into the filter holder, and a fluid outlet for letting the fluid filtered with the aid of the filter element out of the filter holder, the fluid inlet being arranged such that an inflow direction of the fluid to be filtered is oriented in the direction of a lateral surface of the filter element that can be received in the receiving section or along an inner wall of the receiving section, particularly substantially orthogonally to the longitudinal direction, whereby the fluid to be filtered flows tangentially and/or helically, particularly in the manner of an oval-shaped helix, around the filter element in order to separate particles contained in the fluid to be filtered on a wall of the receiving section with the aid of centrifugal force.

The filter holder can also be referred to as a housing or filter housing. Due to the fact that the inflow direction is oriented in the direction toward the filter element, the flow against the filter element is direct in comparison to known arrangements. Since the filter holder itself acts as a pre-separator, particularly as a centrifugal separator, additional pre-separators arranged upstream from the filter element can be omitted. This results in a cost advantage compared to known arrangements. The particularly oval-shaped cross-sectional geometry of the receiving section leads to a favorable pre-separation efficiency of the particles in comparison to a circular cross-sectional geometry. Moreover, due to the oval-shaped cross-sectional geometry, narrow or rectangular installation spaces can also be used for receiving the filter holder with the same structural volume. In particular, the filter holder is arranged such that a latitudinal direction of the receiving section is positioned horizontally. Preferably, the inflow direction of the fluid to be filtered is oriented such that the fluid strikes directly on a region of more pronounced curvature of the wall of the receiving section. As a result, the fluid is accelerated greatly. This leads to a favorable pre-separation efficiency in comparison to a receiving section with a circular cross section. The term "oval-shaped" can be understood here as a rectangular geometry with rounded-off corners, an at least approximately elliptical geometry, or a geometry formed from several curved or circular sections. An oval shape with two axes of symmetry that intersect particularly orthogonally at a midpoint through which a center axis of filter holder and/or filter element(s) runs perpendicular to the two axes of symmetry is preferred here both for the filter holder and for the filter elements and/or sealing device thereof. Elliptical shapes can also be produced through approximated constructions of ellipses, such as by means of circles of curvature or according to la Hire, for example. Preferably, the receiving section has a first and a second housing part that can be interconnected with the aid of fastening means. The housing parts can be made of a plastic material. Preferably, the housing parts are plastic injection-molded components. Alternatively, the housing parts can also be made of sheet metal. The receiving section can also be embodied as a single piece. That is, the housing parts can be integrally connected to one another. The particles can, for example, be sand, dust, plant parts or the like.

In embodiments, the inflow direction of the fluid to be filtered is oriented perpendicular to the longitudinal direction of the filter element that can be received in the receiving section. As a result, the fluid to be filtered flows partially into the interspace between receiving section and filter element and, optionally, at least partially directly against the filter element as well, flowing around same preferably helically.

In other embodiments, the receiving section is set up to receive the filter element in the center of the receiving section with respect to a longitudinal direction of the filter element. A second end plate of the filter element can have clamping elements that are elastically deformable in the longitudinal direction and with the aid of which the filter element can be optimally positioned in the receiving section. The elastically deformable clamping elements also serve to provide vibration damping and/or tolerance compensation.

In other embodiments, the receiving section is set up to receive the filter element such that constant spacing is provided between the filter element and the wall of the receiving section perpendicular to the outer lateral surface of the filter element and/or perpendicular to the inner wall of the receiving section circumferentially around the filter element. The spacing is preferably substantially or completely constant over the longitudinal direction but can also vary in the longitudinal direction. For example, the space can decrease or increase in the longitudinal direction. The filter element can taper conically in the longitudinal direction, for example, with or against the outflow direction.

In other embodiments, the receiving section has a latitudinal direction and a vertical direction in cross section that preferably coincide with axes of symmetry of the oval shape, the fluid inlet being arranged such that the inflow direction of the fluid is arranged perpendicular to the latitudinal direction. Preferably, the fluid inlet is arranged laterally on the receiving section such that the inflowing fluid strikes the wall of the receiving section.

In other embodiments, an extension of the receiving section in the latitudinal direction is greater than in the vertical direction. For example, the receiving section is at least 1.5 times and preferably two to three times wider than high. Preferably, the width-to-height ratio of the filter element to be received in the receiving section is greater than the width-to-height ratio of the receiving section. More preferably, a fitting filter element has such a similar heightto-width ratio and particularly a shape that is such that constant spacing is provided between the filter element and the wall of the receiving section perpendicular to the outer lateral surface of the filter element and/or perpendicular to the inner wall of the receiving section circumferentially around the filter element.

In other embodiments, the fluid inlet has an oval-shaped cross section with a diameter that is greater parallel to the longitudinal axis of the filter holder than perpendicular to the longitudinal axis. Low pressure loss during flowing of the fluid to be filtered into the fluid inlet can be achieved in this way. Alternatively, the fluid inlet can have a circular cross section.

In other embodiments, the filter holder comprises a removable maintenance cover having a particle discharge opening. The maintenance cover is preferably a plastic injection-molded component. The maintenance cover can be made of a sheet metal. The maintenance cover can be attached to the receiving section using quick-action fasteners. The particle discharge opening can have a valve.

In other embodiments, the maintenance cover has a tubular, particularly oval-shaped tubular incident-flow guard that particularly projects into the interior of the filter holder and in which the filter element can be received at least partially and preferably coaxially. The incident-flow guard is preferably formed in a materially integral manner with the maintenance cover. The length of the incident-flow guard is preferably designed such that it surrounds the filter element over about 15-50%, preferably 20-40% of its total length in the longitudinal direction starting from the closed end plate, that is, the length of the incident-flow guard in the longitudinal direction is about 15-50%, preferably 20-40% of the length of the filter element.

Furthermore, a filter element is proposed that has an oval-shaped cross section transverse to a longitudinal direction thereof. The filter element comprises a first end plate, a second end plate, and a filter body arranged between the first end plate and the second end plate, it being possible for the filter element to have an incident-flow guard that covers the filter body at least partially. The filter element can have features named above and/or below or in the claims.

The incident-flow guard can also be provided on the receiving section. With the aid of the incident-flow guard, particles contained in the fluid to be filtered, such as sand, for example, are prevented from striking the filter medium directly. This prevents the filter medium from being damaged. This increases the service life of the filter element. The filter element is preferably an air filter for filtering intake air for a combustion engine. Preferably, the filter element is used in motor vehicles, trucks, construction vehicles, watercraft, railway vehicles, agricultural machines and vehicles or aircraft. The filter medium is preferably folded in a zigzag pattern. The filter medium is a filter paper, a filter fabric, a filter roving or a nonwoven filter web, for example. Particularly, the filter medium can be manufactured using a spun-bonded or meltblown process. Moreover, the filter medium can be felted or needled. The filter medium can have natural fibers, such as cellulose or cotton, or synthetic fibers, such as polyvinyl sulfite or polytetrafluoroethylene. The fibers can be oriented obliquely and/or transverse to the machine direction during processing, or they can be unordered. The filter medium can be fused with or adhered or welded to the end plates.

In embodiments, the incident-flow guard is adhered or welded to or fused with the filter body formed from the filter medium. Alternatively, the incident-flow guard lies flush and preferably loosely on the filter medium, particularly the folding edges of the filter medium. In particular, the incident-flow guard is arranged adjacent to a first end plate of the filter element. The incident-flow guard can be connected to the first end plate, for example enclosed by its material in a partially form-fitting manner.

In other embodiments, the incident-flow guard is fluid-tight. The incident-flow guard can be a film. Alternatively, the incident-flow guard can be fluid-permeable. For example, the incident-flow guard can be made of a fine-mesh net or lattice. Preferably, the incident-flow guard is made of a plastic material.

In other embodiments, the filter element surrounds a secondary element, which can also be received in the filter holder. The filter element can also be referred to as the first filter element and the secondary element as the second filter element. The first end plate of the filter element preferably has a receiving opening into which the secondary element can be pushed. At the same time, this receiving opening preferably represents the outflow cross section of the first filter element.

In other embodiments, the filter element has a sealing device provided on the preferably open first end plate, the sealing device being set up to seal the filter element particularly radially or axially with respect to a filter holder such that the inflow side or unfiltered side of the filter element is separated from the outflow side or filtered side. Preferably, the sealing device is embodied in a materially integral manner with the first end plate. Particularly, the first end plate and the sealing device can be made from a particularly cast polyurethane material, particularly a foamed polyurethane material. The sealing device can preferably be deformed in a spring-biased manner. The sealing device is preferably set up so as to seal the filter element radially inward with respect to the filter holder, i.e., in the direction toward a fluid outlet of the filter holder and preferably has an inwardly aligned, annularly closed, particularly oval-shaped sealing surface for this purpose. The sealing device can also be set up for the purpose of sealing the filter element axially with respect to the filter holder.

Moreover, a filter arrangement with such a filter holder and such a filter element received in a receiving section of the filter holder is proposed, a fluid inlet of the filter hold-holder being arranged such that an inflow direction of the fluid to be filtered is oriented in the direction of a lateral surface of the filter element received in the receiving section such that the fluid to be filtered flows tangentially and/or helically, particularly in the manner of an oval-shaped helix, around the filter element received in the receiving section in order to separate particles contained in the fluid to be filtered on a wall of the receiving section with the aid of centrifugal force.

Preferably, the inflow direction of the fluid to be filtered is oriented such that the fluid strikes directly on a curvature of the wall of the receiving section. As a result, the fluid is accelerated greatly, whereby the centrifugal forces acting on the fluid are increased. This promotes the particle pre-separation efficiency. The filter arrangement can also be referred to as a two-stage filter, the first stage being constituted by the centrifugal separation and the second stage by a filter element.

Moreover, a filter element having an oval-shaped cross section in a longitudinal direction thereof is proposed that can preferably be used particularly in a filter holder according to the invention.

The filter element comprises a circumferential sealing device for sealing the filter element particularly radially with respect to a filter holder for the filter element, the sealing device having two first curved sections arranged opposite one another and two second curved sections arranged opposite one another, the first curved sections each having a first radius of curvature and the second curved sections each having a second radius of curvature, the first radius of curvature differing from the second radius of curvature. One construction of the seal exclusively with two different radii, each of which is completely or at least substantially constant over the individual curved sections, can have advantages with respect to tool manufacturing and quality control.

The second radius of curvature can approach infinite, that is, it can also be straight, which also applies analogously to an oval shape of the filter element. In one embodiment, the sealing device has a substantially stadium-like geometry. It has also proven advantageous for the sealing device to have no straight sections, but rather only curved sections. This is particularly evident if the filter element and/or the filter body formed from a filter medium has an oval-shaped cross section whose outer contour has partially straight or slightly curved sections. By virtue of the fact that the sealing device has substantially exclusively curved sections, constant contact pressure of the sealing device against an engagement area of the filter holder can be achieved over the entire periphery of the sealing device. The sealing device is preferably set up for the purpose of sealing the filter element radially inward with respect to the filter holder. More pronounced curvatures or smaller radii on the sealing device are more advantageous when forming a seal radially inward or outward than less pronounced curvatures or larger radii, since, as the curvature increases, the danger of the sealing device losing contact with a seal contact surface on the filter holder side under a vibrational load decreases. Alternatively or in addition, the sealing device can also be set up for the purpose of sealing the filter element axially with respect to the filter holder. The term "inward" is to be understood herein as a direction oriented radially toward a fluid outlet of the filter holder. The sealing device can preferably be deformed in a spring-biased manner. The filter element can spatially surround a secondary element. The sealing device preferably runs completely around a first end plate of the filter element. The filter element is preferably an air filter for filtering intake air for a combustion engine. Preferably, the filter element is used in motor vehicles, trucks, construction vehicles, watercraft, railway vehicles, agricultural machines and vehicles or aircraft.

According to the idea of the invention, it is advantageous but not absolutely necessary to select a profile for the sealing device that is particularly formed exclusively of circular sections. One substantial advantage lies namely in the fact that the sealing device has only curved sections, particularly is continuously curved in one direction, thus creating a continuously convex outer contour or straight or concave sections. The invention therefore relates more generally to a filter element as well having an oval-shaped cross section defined by a filter body of a filter medium with two first opposing curved sections with a more pronounced curvature that are interconnected by two opposing curved sections with a less pronounced curvature compared to the first curved sections, the filter element further including an oval-shaped circumferential sealing device particularly for sealing the filter element radially with respect to a filter holder, the sealing device having two mutually opposed first curved sections with a more pronounced curvature and two curved sections with a less pronounced curvature compared to the first curved sections, the second curved sections of the sealing device having a more pronounced curvature than the second curved sections of the oval-shaped cross section defined by the filter body. The first curved sections are preferably interconnected by the second curved sections such that first and second curved sections transition respectively into one another, particularly transition directly into one another, preferably constantly and more preferably smoothly. One consequence of this, for example, is that, in the transition portion between first and second curved sections, no additional curved section can be present with a curvature that is greater than the curvature of the first two curved sections. This offers the advantage that, despite the non-circular shape, a good circumferential sealing effect can be ensured.

Preferably, an oval-shaped cross section or profile is selected for the sealing device and/or the filter body and/or at least one of the end plates that has a midpoint and two axes of symmetry intersecting therewith and/or a width-to-height ratio of greater than 1.5:1, preferably greater than 2:1, more preferably less than 5:1 or 4:1, especially preferably less than 3:1. Width-to-height ratios of the filter element and/or filter body in the range between 1.5:1 and 3:1 are especially advantageous for a pre-separation effect by centrifugal force. Especially preferably, filter body and sealing device have the same axes of symmetry. Especially preferably, the filter element has a longitudinal axis of symmetry to which the sealing device and/or the filter body and/or at least one end plate are at least substantially symmetrical. This longitudinal axis of symmetry preferably runs through the point of intersection of the abovementioned intersecting axes of symmetry, preferably perpendicularly thereto in each case. The longitudinal axis of symmetry is preferably coaxial with the center axis of filter holder and/or filter element or can be defined by them.

It is especially preferred in all embodiments that the second curved sections of the sealing device and the second curved sections of the oval-shaped cross section defined by the filter body are arranged adjacent to one another, that is, they have substantially the same angular position with respect to the oval shape. The same applies to the first curved section of the sealing device that has a more pronounced curvature than the second, and to the cross section defined by the filter body.

In embodiments, curvature midpoints of the first radii of curvature are arranged on a first line and the curvature midpoints of the second radii of curvature are arranged on a second line, the first line being positioned perpendicular to the second line. Preferably, the second radii of curvature are greater than the first radii of curvature. The first radii of curvature are preferably of equal size. The second radii of curvature are preferably of equal size.

In other embodiments, the second line is arranged in the center between the curvature midpoints of the first radii of curvature and/or the first line is arranged in the center between the curvature midpoints of the second radii of curvature. The end points of the line are respectively defined by the curvature midpoints. Preferably, the first line bisects the second line and vice versa.

A filter element according to the invention preferably has a filter body formed from a filter medium. The filter body can preferably be flowed through radially from the outside or vice versa. The filter body can preferably be formed by an annularly closed filter medium that is folded in a zigzag pattern and have a circular, oval or elliptical shape. Furthermore, the filter body can be formed from a tubular, particularly multilayered winding of a filter medium. Alternatively, the filter body can be embodied as a filter body that can be flowed through axially, for example through a particularly oval-shaped winding of a semifinished product with two layers of filter medium, a corrugated layer, and a smooth layer that form mutually sealed channels.

In other embodiments, the filter element has at least one end plate and a filter body connected to the end plate, the sealing device being provided on a front side of the particularly open end plate facing away from the filter body. The end plate is preferably a first end plate of the filter element. Preferably, the filter element has two end plates between which the filter body is arranged. The sealing device can be embodied in a materially integral manner with the first end plate. The second end plate can preferably be closed.

In other embodiments, an outer contour and/or inner contour of the sealing device is not arranged parallel to an outer contour and/or inner contour of the end plate. Preferably, the outer or inner contour of the sealing device does not follow the outer or inner contour of the end plate, that is, the distance of the outer contour of the sealing device from the outer contour of the end plate is not constant. More preferably, the sealing surface, i.e., the contact surface of the sealing device that rests in a sealing manner against a corresponding seal contact surface of the housing, does not follow the outer contour of the end plate. In the case of a radial seal, this generally applies to the radial inner surface of the sealing device, but the radial outer surface of the sealing device can also form the sealing surface. Especially preferably, the sealing device, particularly the inner surface of the seal, is nearer to the outer (particularly radially outer) lateral surface of the filter body and/or the outer contour of an open end plate in the center of the curved sections of the filter body and/or of the sealing device with lesser curvature than in the transitional portion between curved sections of the filter body and/or sealing device with pronounced and non-pronounced curvature. In this way, the curvature of the seal in the slightly curved region of the filter body can be reinforced and thus optimized with respect to the reliability of the seal under a vibrational load. Geometrically speaking, this preferably results in the curvature of the second curved sections of the seal not being constructable even by means of a scale enlargement/reduction (central stretching) of the outer contour of the open end plate and/or of the filter body. Rather, this preferably means that the curvature of the second curved sections of the seal is more pronounced than the curvature of a comparable, particularly concentric curve that is particularly parallel to the outer contour of filter body and/or open end plate, particularly obtained from the outer contour through scale reduction or within the outer contour and running parallel thereto that is at least substantially the same distance to the outer contour of end plate and/or filter body in the center of the second curved sections of seal, outer contour of the end plate and/or outer contour of the filter body.

In an advantageous embodiment, the sealing device is arranged within an imaginary axial continuation of the outer lateral surface of the filter body and/or of the outer contour of an open end plate in the longitudinal direction. This offers the advantage that the sealing device does not require any additional installation space radially to the longitudinal direction and can be embodied directly, for example integrally with or in the same material as the end plate. If an annularly closed filter bellows made of a filter medium folded in a zigzag or radial manner is used, it can be especially advantageous for the sealing device to be arranged within a cross section of the filter body (more specifically within an imaginary axial continuation of the cross section in the longitudinal direction). This offers the advantage that the cross section of the outflow path from the filter element is not unnecessarily reduced by the sealing device, which would increase the flow resistance.

In other embodiments, the filter element has an incident-flow guard that encloses the filter body at least in sections. With the aid of the incident-flow guard, particles contained in the fluid to be filtered, such as small stones, for example, are prevented from striking the filter medium directly. This prevents the filter medium from being damaged. This increases the service life of the filter element.

In other embodiments, the incident-flow guard is adhered, welded or fused to the filter body. Alternatively, the incident-flow guard lies flush and preferably loosely on the filter medium, particularly the folding edges of the filter medium. In particular, the incident-flow guard is arranged adjacent to a first end plate of the filter element. The incident-flow guard can be connected to the first end plate, for example enclosed by its material in a partially form-fitting manner. As a result, the incident-flow guard can be permanently connected to the filter body by means of the end plate material, particularly polyurethane or polyurethane foam.

In other embodiments, the incident-flow guard is fluid-tight. The incident-flow guard can be a film. Alternatively, the incident-flow guard can be fluid-permeable. For example, the incident-flow guard can be made of a fine-mesh net or lattice. Preferably, the incident-flow guard is made of a plastic material.

The incident-flow guard runs preferably once completely, particularly in an annularly closed manner, around the filter body. In this way, it can be ensured that a filter element that can be installed in two positions due to symmetry is protected in both positions from frontal flow through a fluid inlet and/or that the formation of the unfiltered fluid flow rotating around the filter element that is important for the pre-separation is ensured in like manner in both installation positions. The incident-flow guard should preferably extend over the entire periphery, or at least axially from the first end plate so far over the filter body in the regions that may be subjected to direct flow that the axial extension of the fluid inlet of a filter housing is covered. Depending on the design of the filter system, this is the case if the incident-flow guard extends over at least 15, 20 or 25% of the axial length of the filter body and/or a maximum of 80, 70, 60, 50, 40 or 30% of the axial length of the filter body.

Moreover, a filter arrangement with such a filter holder and such a filter element is proposed that is received in a receiving section of the filter holder.

In embodiments, the receiving section has an engagement area into which a circumferential sealing device of the filter element engages, the sealing device abutting with an inner surface against the engagement area. The engagement area is preferably provided circumferentially around a fluid outlet of the filter holder. The sealing device preferably abuts on the inside against the engagement area.

Moreover, a filter holder particularly for a filter element according to the invention is proposed that has an oval-shaped cross section transverse to a longitudinal direction thereof. The filter holder comprises a receiving section for receiving the filter element, a fluid inlet for allowing fluid to be filtered into the filter holder, and a fluid outlet for letting the fluid filtered with the aid of the filter element out of the filter holder, the fluid inlet being arranged such that an inflow direction of the fluid to be filtered into the fluid inlet is oriented parallel to the longitudinal direction of the filter element, the fluid inlet having a guide member that is set up for the purpose of deflecting the fluid to be filtered upon flowing into the fluid inlet such that it flows in a helical manner around the filter element that can be received in the receiving section in order to separate particles contained in the fluid to be filtered on a wall of the receiving section with the aid of centrifugal force.

The guide member can be a guide vane. By virtue of the fact that the fluid to be filtered flows around the filter element in the manner of a spiral, screw or helix, the filter holder acts as a pre-separator for separating the particles. Additional pre-separators can thus be omitted. As a result, the filter holder can be especially cost-effective to manufacture. The filter holder preferably has an oval-shaped cross section. The preferably oval-shaped cross-sectional geometry of the receiving section leads to a favorable pre-separation efficiency of the particles in comparison to a circular cross-sectional geometry. Moreover, due to the oval-shaped cross-sectional geometry, narrow or rectangular installation spaces can also be used for receiving the filter holder. In particular, the filter holder is arranged such that a latitudinal direction of the receiving section is positioned horizontally. Preferably, the receiving section has a first and a second housing part that can be interconnected with the aid of fastening means. The housing parts can be made of a plastic material or of a metallic material. Preferably, the housing parts are plastic injection-molded components. The receiving section can also be embodied as a single piece. That is, the housing parts form a component. Preferably, the maintenance cover can be removed from the receiving section.

In embodiments, the filter holder has a plurality of fluid inlets. Each fluid inlet has at least one guide member. The guide members are preferably embodied as guide vanes.

In other embodiments, the fluid inlets are arranged uniformly over the periphery of the filter holder. Preferably, the fluid inlets are arranged so as to be uniformly spaced-apart from one another. Alternatively, the fluid inlets can be arranged in an irregular manner.

In other embodiments, a respective angle of curvature of the guide members changes over a periphery of the filter holder. Each guide member preferably has a first section oriented parallel to the inflow direction and a second section oriented obliquely to the inflow direction. The sections are arranged so as to tilt relative to one another in the angle of curvature. The angles of curvature of all guide members can be equal. Alternatively, the guide members can have different angles of curvature. For example, the angles of curvature can vary over a periphery of the filter holder.

In other embodiments, a respective inflow cross section of the fluid inlets changes over a periphery of the filter holder. The inflow cross section can be rectangular or round, for example. The pre-separation efficiency can be optimized by varying the inflow cross sections.

In other embodiments, the fluid inlet is arranged on a maintenance cover that can be removed from the filter holder. Preferably, the fluid inlet is an opening in the maintenance cover. The maintenance cover preferably also has the guide members. The guide members are particularly formed in a materially integral manner with the maintenance cover. The maintenance cover can be attached to the filter holder with the aid of quick-action fasteners.

In other embodiments, the guide member is positioned such that it is arranged next to same in the longitudinal direction of the filter element. Preferably, a plurality of guide members is arranged around the filter element. As a result, the installation space available for the filter holder can be optimally exploited by the filter element. The length of the filter element can thus correspond approximately to the length of the filter holder.

In other embodiments, the filter holder has a tubular incident-flow guard in which the filter element can be arranged at least partially. The incident-flow guard or the incident-flow edge is preferably fluid-tight.

In other embodiments, the incident-flow guard is embodied in a materially integral manner with a maintenance cover of the filter holder and/or with the filter holder. The maintenance cover is preferably a cost-effective plastic injection-molded component. The maintenance cover can be made of sheet metal.

Moreover, a filter arrangement with such a filter holder and a filter element that is received in a receiving section of the filter holder is proposed.

Moreover, a filter holder particularly for a filter element according to the invention is proposed that has an oval-shaped cross section transverse to a longitudinal direction thereof. The filter holder comprises a receiving section for receiving the filter element, a fluid inlet for letting in fluid to be filtered into the filter holder, and a fluid outlet for letting the fluid filtered with the aid of the filter element out of the filter holder, the fluid outlet being arranged such that an outflow direction of the filtered fluid from the fluid outlet is oriented parallel to the longitudinal direction of the filter element, and the fluid outlet having a circular cross section facing away from the fluid outlet and an oval-shaped cross section facing toward the filter element.

As a result, the pressure loss as the filtered fluid flows out is reduced. This increases the efficiency of a filter arrangement with such a filter holder. Preferably, the height of the oval-shaped cross section is smaller than the diameter of the circular cross section.

In embodiments, the circular cross section and the oval-shaped cross section of the fluid outlet have the same cross-sectional surface area. As a result, the filtered fluid can flow off unimpeded. The oval-shaped cross section can also have a larger cross-sectional surface area than the circular cross section.

In other embodiments, the fluid outlet has a curved transitional section that connects the circular cross section of the fluid outlet to the oval-shaped cross section of the fluid outlet. The transitional cross section is preferably curved in an S-shape.

In other embodiments, the fluid inlet widens in a latitudinal direction of the filter element from the circular cross section to the oval-shaped cross section. Preferably, a width of the oval-shaped cross section is greater than a diameter of the circular cross section.

In other embodiments, the fluid inlet narrows in a vertical direction of the filter element from the circular cross section to the oval-shaped cross section. Preferably, a height of the oval-shaped cross section is smaller than a diameter of the circular cross section.

In other embodiments, the filter holder has a tubular incident-flow guard in which the filter element can be received at least partially. The incident-flow guard or the incident-flow edge is preferably fluid-tight.

In other embodiments, the incident-flow guard is embodied integrally with a maintenance cover that can be removed from the filter holder. The maintenance cover is preferably a cost-effective plastic injection-molded component. Alternatively, the maintenance cover can be made of sheet metal, particularly sheet steel.

Furthermore, a filter element is proposed that has an oval-shaped cross section transverse to a longitudinal direction thereof. The filter element comprises a first end plate, a second end plate, and a filter body arranged between the first end plate and the second end plate, a cross section of the filter body on the second end plate being greater than a cross section of the filter medium on the first end plate. The filter element can have one or more of the features described above or below or in the claims.

Preferably, the filter body tapers conically on the inside. This enables an enlarged fluid outlet opening of the filter element in comparison to a filter body that does not taper conically. The transitional section of the fluid outlet can hereby be optimized, since the height of the oval-shaped cross section of the fluid outlet can approach the diameter of the circular cross section of the fluid outlet. This leads to further reduced pressure loss. The filter element is preferably an air filter element for filtering intake air for a combustion engine. Preferably, the filter element is used in motor vehicles, trucks, construction vehicles, watercraft, railway vehicles, agricultural machines and vehicles or aircraft.

In embodiments, the cross section of the filter body enlarges continually from the first end plate in the direction toward the second end plate. The filter element can surround a secondary element that can be received in the filter holder. The secondary element can have a conical or frustoconical geometry corresponding to the filter body of the first filter element.

Moreover, a filter arrangement with such a filter holder and such a filter element and/or secondary element is proposed that is received in a receiving section of the filter holder.

Other possible implementations of the invention also comprise combinations of features or method steps that were not explicitly mentioned previously or that are described below in relation to the exemplary embodiments. A person skilled in the art will also add individual aspects to the respective basic form of the invention as improvements or supplementations.

Other embodiments of the invention are the subject of the subclaims and of the exemplary embodiments of the invention described below. The invention will be explained in further detail below on the basis of exemplary embodiments with reference to the enclosed figures.

BRIEF DESCRIPTION OF THE DRAWINGS

In the figures, same or functionally equivalent elements have been provided with the same reference symbols unless indicated otherwise.

DETAILED DESCRIPTION

Figure 1:
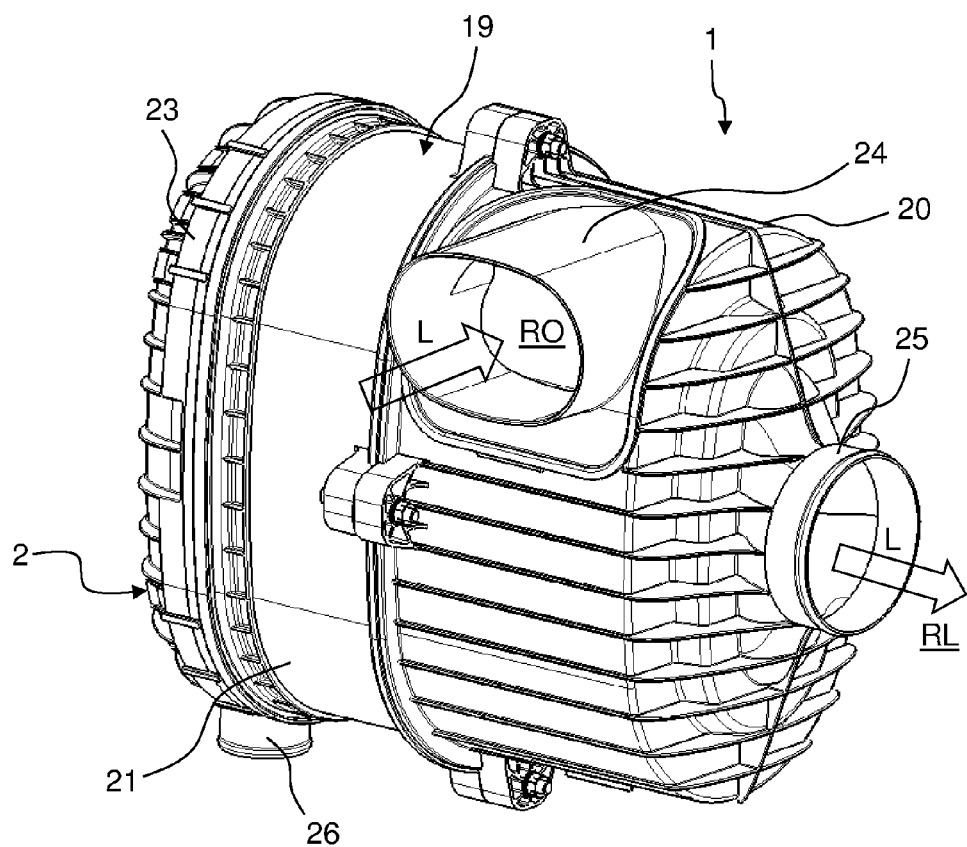
FIG. 1 shows a schematic, perspective view of an embodiment of a filter arrangement.
Figure 2:
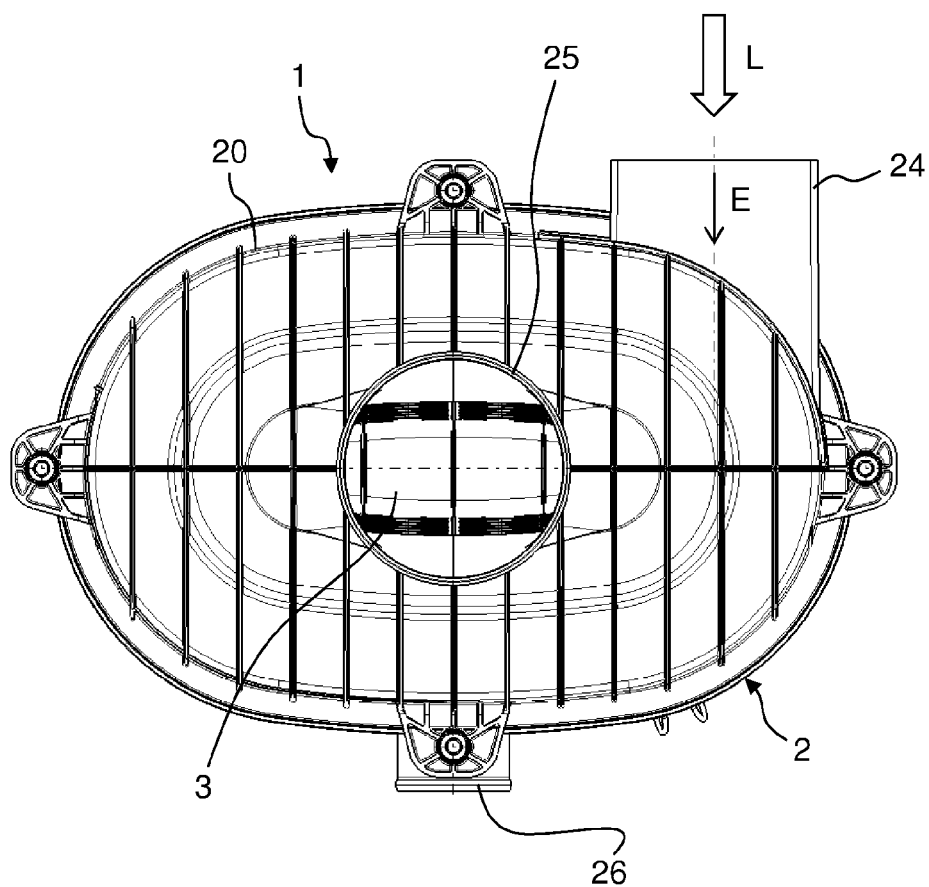
FIG. 2 shows a schematic view of the filter arrangement according to FIG. 1.
Figure 3:
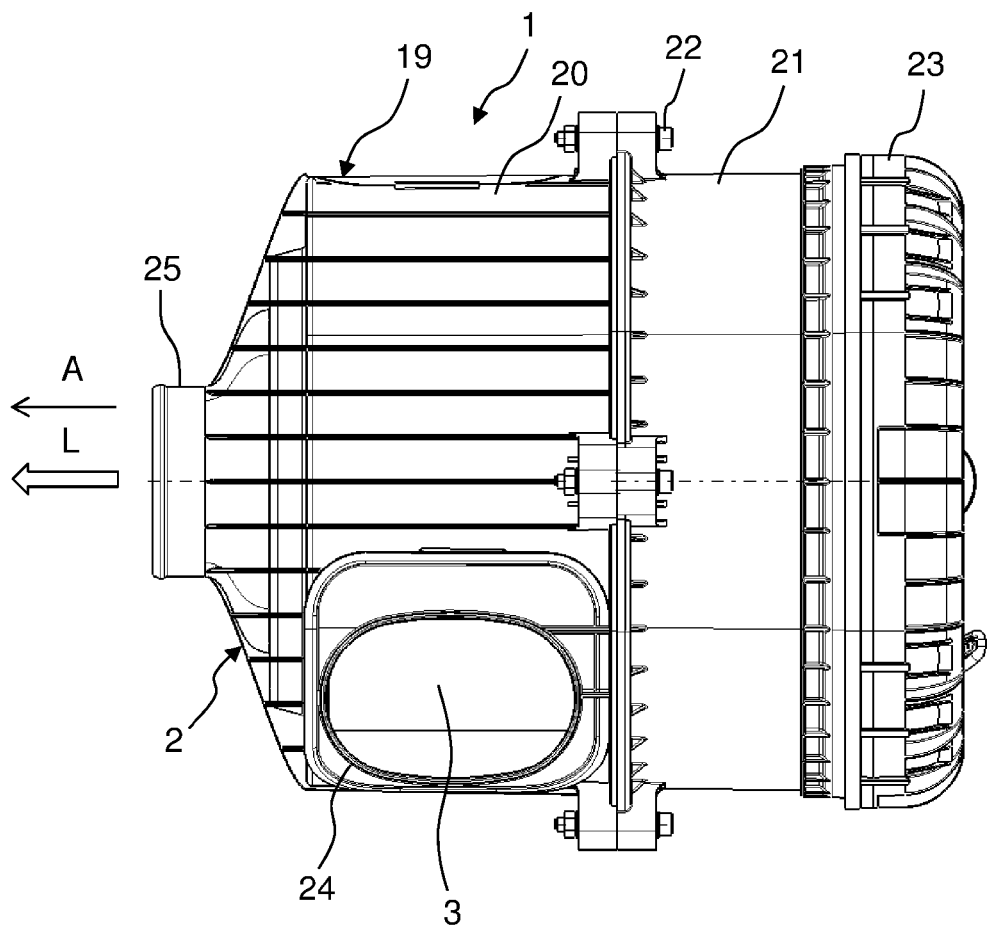
FIG. 3 shows a schematic view of the filter arrangement according to FIG. 1.
Figure 4:
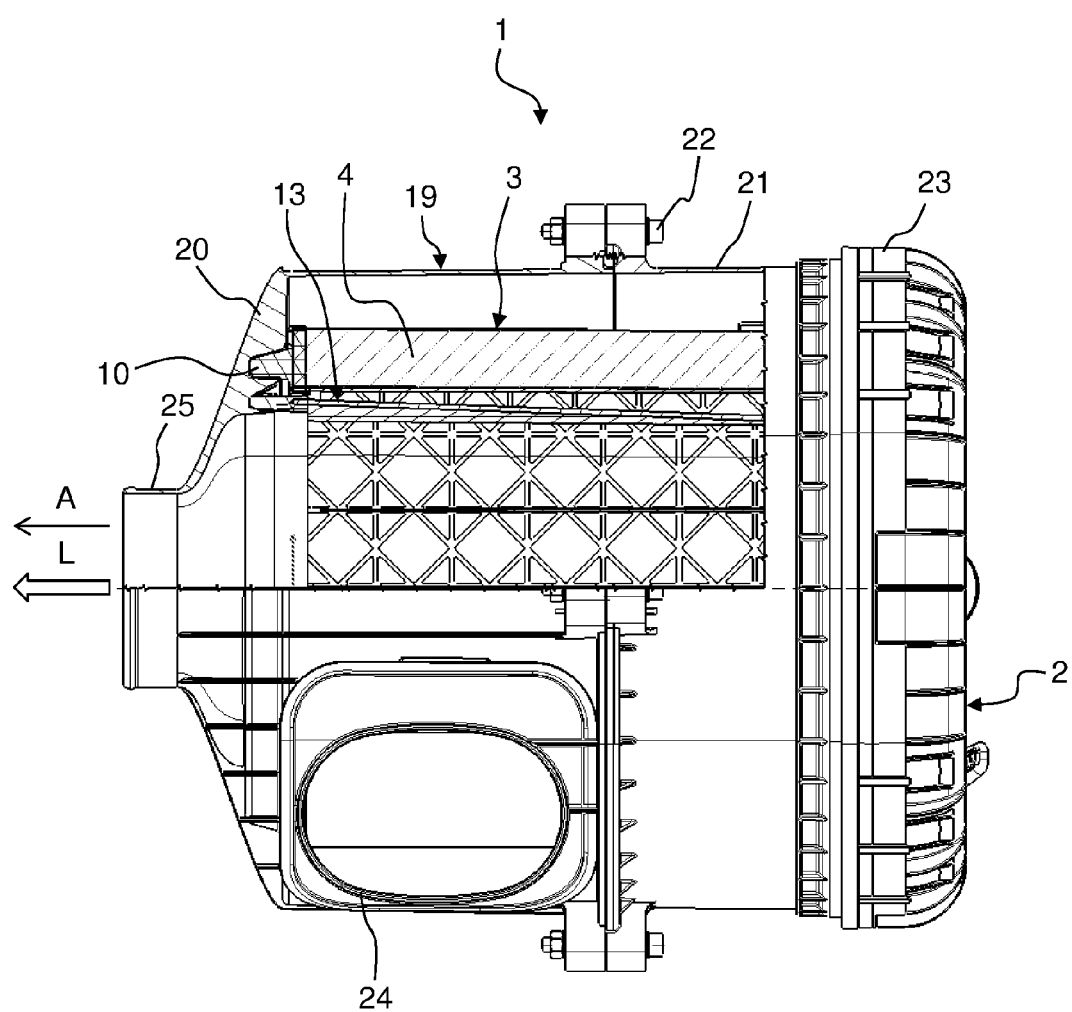
FIG. 4 shows a partial sectional view of the filter arrangement according to FIG. 1.
Figure 5:
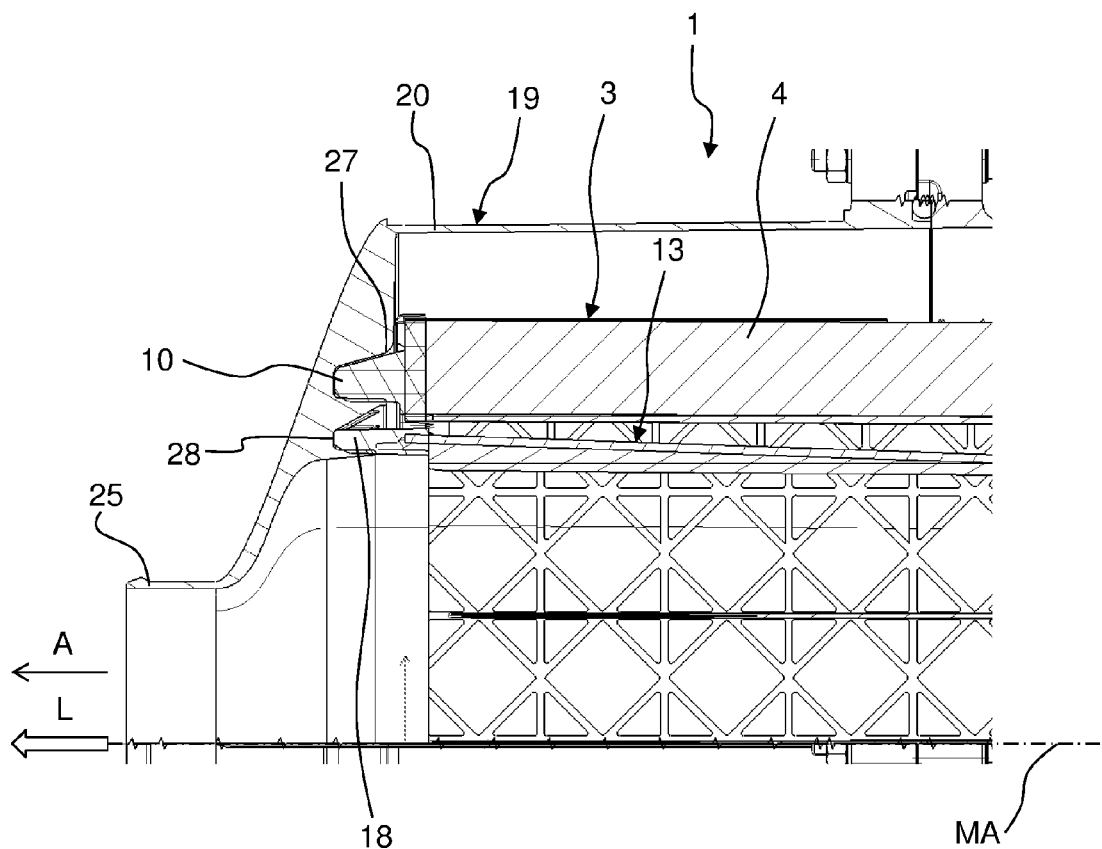
FIG. 5 shows a partial sectional view of the filter arrangement according to FIG. 1.

FIG. 1 shows a schematic, perspective view of an embodiment of a filter arrangement 1. FIG. 2 shows a front view of the filter arrangement 1. FIG. 3 shows a side view of the filter arrangement 1. FIG. 4 and FIG. 5 each show partial sectional views of the filter arrangement 1.

Figure 6:
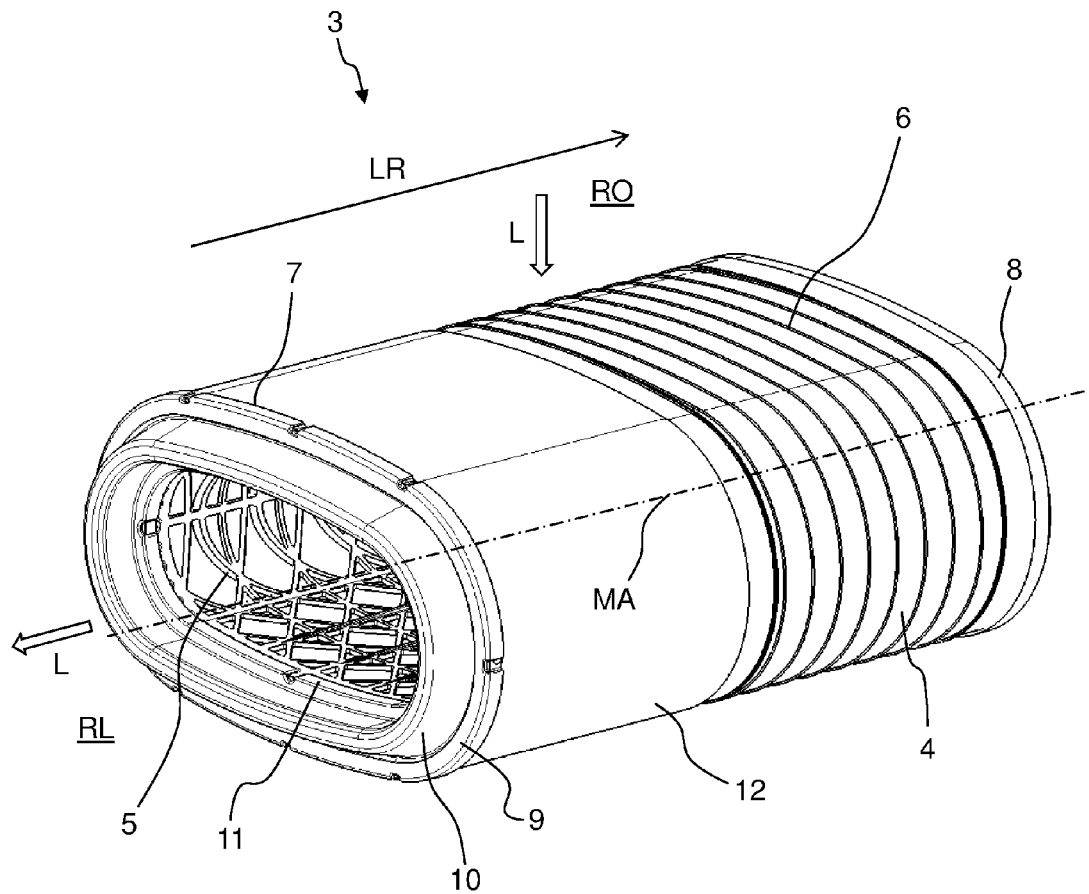
FIG. 6 shows a schematic, perspective view of an embodiment of a filter element.

The filter arrangement 1 comprises a filter holder 2 and a filter element 3 arranged in the filter holder 2. The filter holder 2 can also be referred to as a housing or filter housing. The filter element 3 is shown in FIG. 6. The filter arrangement 1 is preferably used as an intake air filter for combustion engines, for example in motor vehicles, trucks, construction vehicles, watercraft, railway vehicles, agricultural machines and vehicles or aircraft. The filter element 3 is particularly suited to filtering combustion air of a combustion engine. Preferably, the filter element 3 is an air filter element.

The filter element 3, which can also be referred to as a primary element or main element, comprises a filter body 4 that surrounds a center tube 5 and preferably abuts against same such that the center tube 5 can carry out a support function for the filter body when it is being flowed through. For example, the filter body 4 can be wound onto the center tube 5 as a winding of a filter medium, or it can be closed on same in the manner of a ring, for example in the form of a radially folded bellows. The center tube 5 is preferably lattice-shaped and thus permeable to fluids. The filter body 4 is preferably folded. For stabilization, the folded filter medium can be wrapped around with a yarn winding package 6, i.e., a strap or yarn that is soaked in a hot-melt adhesive or other adhesive, or it can be fixed by means of adhesive beads running circumferentially in a circular or spiral shape. The filter medium is a filter paper, a filter fabric, filter roving or a nonwoven filter web, for example. Particularly, the filter medium can be manufactured in a spunbonding or meltblown process or comprise such a layer of fibers applied to a nonwoven or cellulose substrate. Moreover, the filter medium can be felted or needled. The filter medium can have natural fibers, such as cellulose or cotton, or synthetic fibers, such as polyvinyl sulfite or polytetrafluoroethylene. The fibers can be oriented obliquely and/or transverse to the machine direction during processing, or they can be unordered.

The filter element 3 has a first, particularly open end plate 7 and a second, particularly closed end plate 8. The end plates 7, 8 are preferably made of a plastic material. For example, the end plates 7, 8 can be embodied as cost-effective plastic injection-molded components. The end plates 7, 8 can, for example, be made of a polyurethane material that is particularly cast, preferably foamed in casting shells. The end plates 7, 8 can be cast against the filter body 4. The filter body 4 is arranged between the end plates 7, 8. A sealing device 10 for sealing the filter element 3 with respect to the filter holder 2 is provided on a front side 9 of the first end plate 7 facing away from the filter body 4. The sealing device 10 is set up for the purpose of sealing the filter element 3, particularly radially, with respect to the filter holder 2.

The filter medium of the filter body 4 can be fused with or adhered or welded to the end plates 7, 8. The second end plate 8 is disc-shaped, for example, and preferably impermeable to fluids. A receiving opening 11 is provided in the first end plate 7 through which the air filtered by the filter element 3 can continue to exit. Moreover, the filter element 3 preferably has an incident-flow guard 12 that prevents particle-laden fluid L from flowing directly against the filter medium 4. The fluid L can be air. The incident-flow guard 12 can be a film or a close-meshed net or screen. The incident-flow guard 12 can be impermeable to fluids or permeable to fluids. The incident-flow guard 12 can be adhered, welded or fused to the filter body 4. The incident-flow guard 12 is arranged adjacent to the first end plate 7. In particular, the incident-flow guard 12 adjoins the first end plate 7. The incident-flow guard 12 can be connected, particularly in a flow-tight manner, to the first end plate 7. Fluid L to be cleaned emerges from an unfiltered side RO of the filter element 3 through the filter body 4 into a cavity surrounded by a center tube 5 and flows out of that as filtered fluid through the receiving opening 11 to a filtered side RL of the filter element 3 particularly surrounded by the filter body 4.

Figure 10:
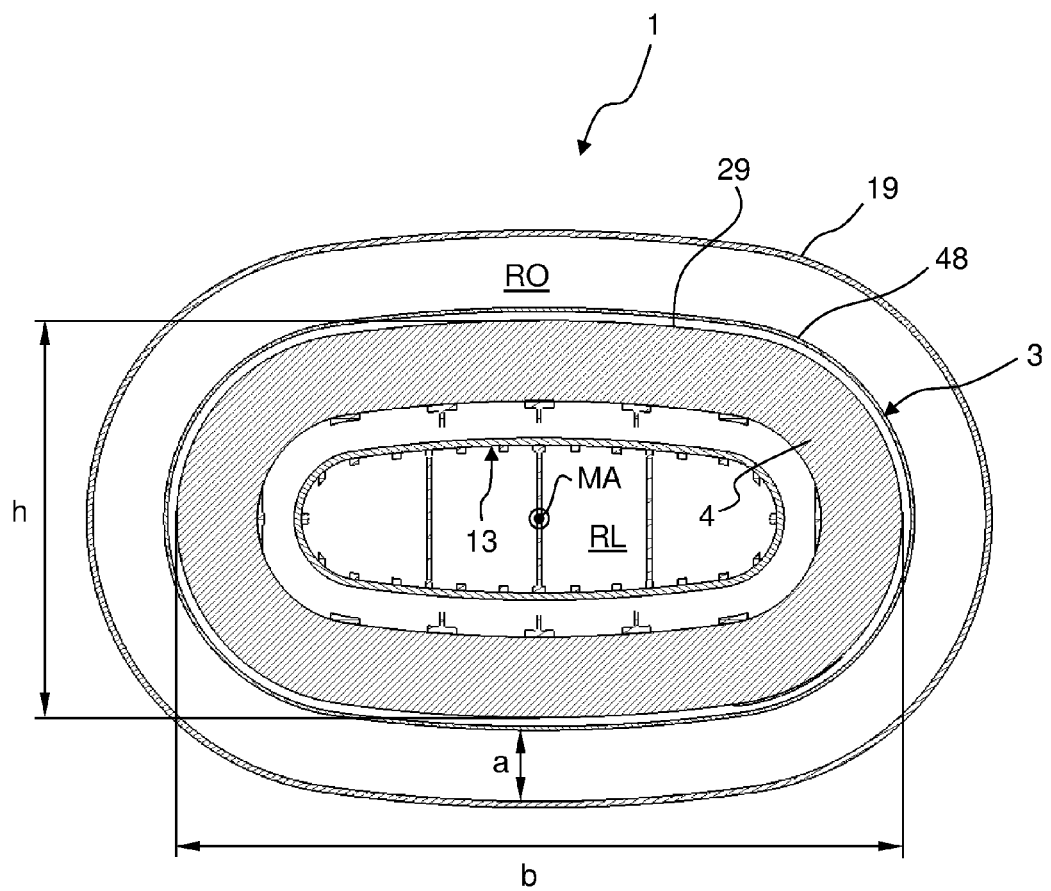
FIG. 10 shows a schematic sectional view of the filter arrangement according to sectional line X-X of FIG. 8.

The filter element 3 preferably has an oval-shaped cross section in a longitudinal direction LR thereof. The cross section can decrease starting from the first end plate 7 in the direction of the second end plate 8, so that the filter element 3 tapers conically. Preferably, however, the filter element 3 has an oval-shaped cross section, as shown in FIG. 6. That is, the filter element 3 is cylindrical with an oval-shaped base surface. In the present document, the term "oval" can be understood as being a shape with a non-concave, smooth outer contour, i.e., that is formed continuously from convex and straight sections, preferably exclusively from convex sections, for example a rectangular cross section with rounded-off corners, an elliptical cross section, or a cross section formed from several circular arcs. Preferably, an oval-shaped outer contour or a cross section is used that has a midpoint and two axes of symmetry intersecting at said midpoint. The filter element 3 and particularly the filter body 4 have a width b and a height h (FIG. 10). The width b is greater than the height h. Preferably, the width b is two to three times the height h; more preferably, the width b is 1.5 to three times the height h.

Figure 7:
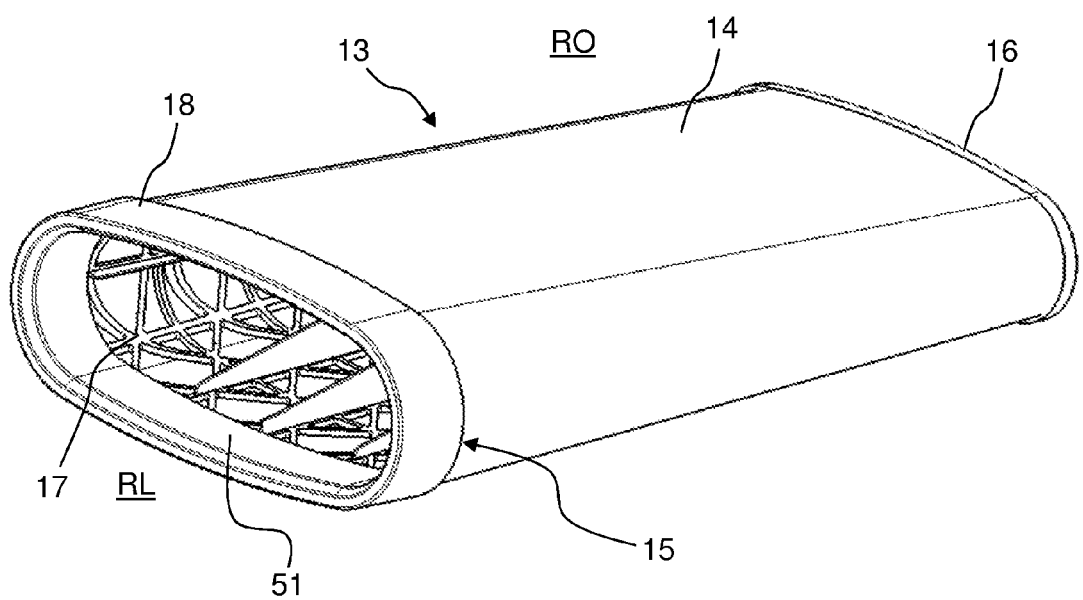
FIG. 7 shows a schematic, perspective view of an embodiment of a secondary element.

A secondary element 13, shown in FIG. 7, can be received in the filter holder 2 surrounded by the filter element 3. Such secondary elements serve particularly as security for cases in which an operator opens the filter holder 2 and removes the filter element 3 while the machine is running, for example in order to remove dust or to change it. Particularly, the filter element 3 can also be referred to as the first filter element and the secondary element 13 as the second filter element. Preferably, the secondary element 13 is received in the receiving opening 11. The secondary element 13 has a filter medium 14 as well as a first end plate 15 and a second end plate 16. The filter medium 14 is arranged between the end plates 15, 16. The filter medium 14 surrounds a lattice-like center tube 17. Like the filter element 3, the secondary element 13 has an unfiltered side RO and a filtered side RL. The first end plate 15 can have a sealing device 18 for sealing the secondary element 13 with respect to the filter holder 2. The sealing device 18 can be embodied in a materially integral manner with the first end plate 15. The filter element 3 and the secondary element 13 can be received in the filter holder 2. The secondary element 13 has a fluid outflow opening 51. The fluid outflow opening 51 can also be referred to as a fluid outflow opening of the filter element 3.

As can be seen in FIGS. 1 to 5, the filter holder 2 comprises a receiving section 19. The receiving section 19 can be formed from a first housing part 20 and a second housing part 21. The housing parts 20, 21 can be interconnected using fastening means 22, such as screws, for example. The housing parts 20, 21 are preferably made of a plastic material. Alternatively, the housing parts 20, 21 can be made of sheet metal, particularly sheet steel. For example, the housing parts 20, 21 can be embodied as cost-effective injection-molded components. A sealing device, such as an O-ring, for example, can be provided between the housing parts 20, 21. Alternatively, the receiving section 19 can be embodied in a single piece. That is, the housing parts 20, 21 form a one-piece component.

Moreover, the filter holder 2 has a maintenance cover 23 that can be removed from the receiving section 19. The filter element 3 can be removed from the receiving section 19 via the maintenance cover 23. The maintenance cover 23 can be attached to the receiving section 19 with the aid of quick-action fasteners. A sealing device can be provided between the maintenance cover 23 and the receiving section 19. FIG. 2 and FIG. 3 show the filter arrangement 1 in two different installation situations, namely in a lying and in a standing orientation.

The filter holder 2 or the receiving section 19 has a fluid inlet 24 for letting the fluid L to be filtered into the filter holder 2 and a particularly central fluid outlet 25 for letting the fluid L filtered with the aid of the filter element 3 out of the filter holder 2. The fluid inlet 24 and the fluid outlet 25 are preferably tubular. The fluid inlet 24 can have an oval-shaped cross section, as shown in FIGS. 1, 3 and 4. With the aid of the oval-shaped cross section, whose extension is preferably oriented in the direction toward the longitudinal direction LR, lower initial pressure loss can be achieved in comparison to a circular cross section. The fluid L to be filtered enters the fluid inlet 24 in an inflow direction E. The fluid outlet 25 preferably has a circular cross section. The fluid L preferably emerges from the fluid outlet 25 in an outflow direction A, preferably parallel to the longitudinal direction LR of the filter element 3. The inflow direction E is oriented perpendicular to the outflow direction A.

A particle discharge opening 26 can be provided on the maintenance cover 23. The particle discharge opening 26 is preferably tubular. Particles that are pre-separated from the fluid L can be discharged from the filter holder 2 via the particle discharge opening 26. The particle discharge opening 26 can have a valve. The housing parts 20, 21 and/or the maintenance cover 23 can be reinforced with ribs.

A first engagement area 27 (FIG. 5) is provided in the filter holder 2 and particularly in the receiving section 19 into which the sealing device 10 of the filter element 3 engages. This engagement area 27 preferably has a seal contact surface against which the sealing device 10 can come to rest in a sealing manner. In the present exemplary embodiment, an oval-cylindrical seal contact surface that is oriented radially outward and follows the profile of the inner surface 43 (sealing surface) of the sealing device 10 is preferably provided as shown. Moreover, a second engagement area 28 can be provided in the receiving section 19 into which the sealing device 18 of the secondary element 13 engages. This second engagement area 28 preferably also has a seal contact surface 280 (see FIG. 32) against which the sealing device 18 can come to rest in a sealing manner. In the present exemplary embodiment, an oval-cylindrical seal contact surface 280 that is oriented radially outward is preferably provided as shown. The first housing part 20 can have the engagement areas 27, 28. The engagement areas 27, 28 can run completely around the fluid outlet 25.

Figure 8:
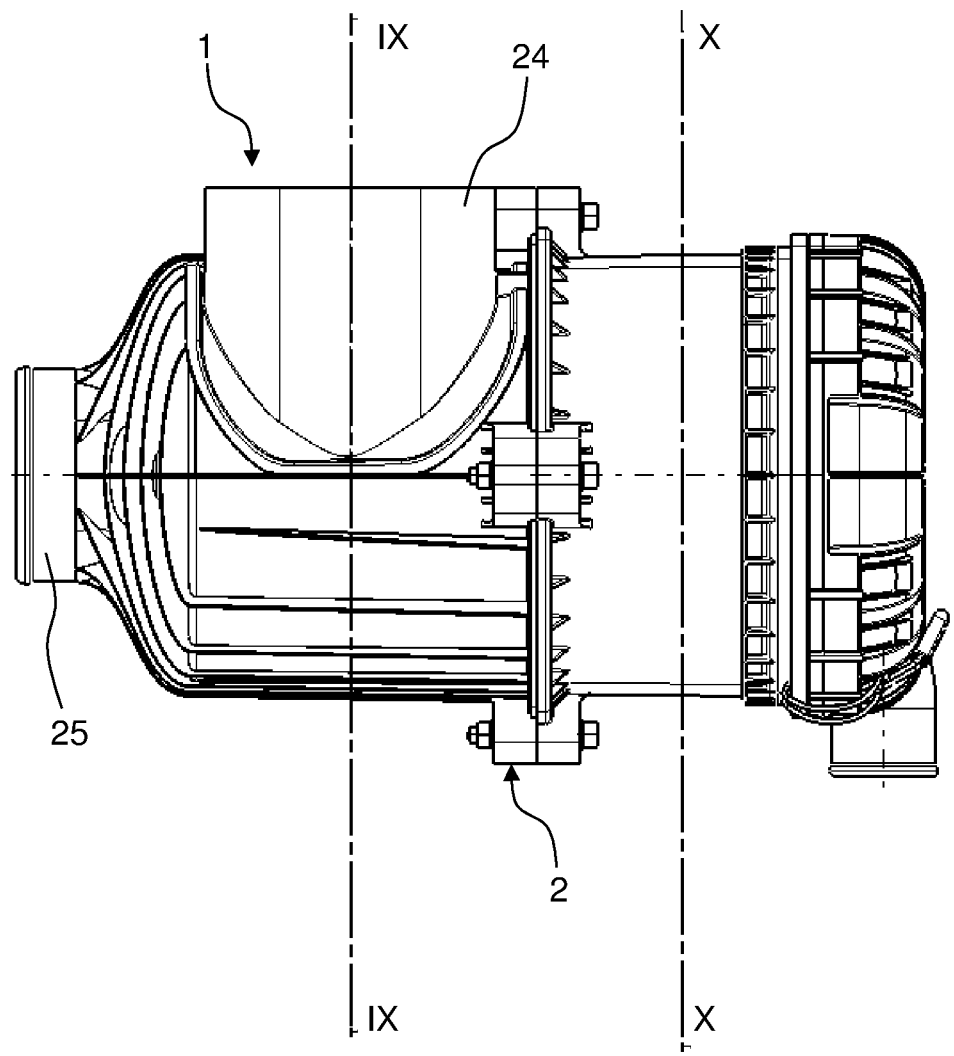
FIG. 8 shows a schematic view of the filter arrangement according to FIG. 1.
Figure 9:
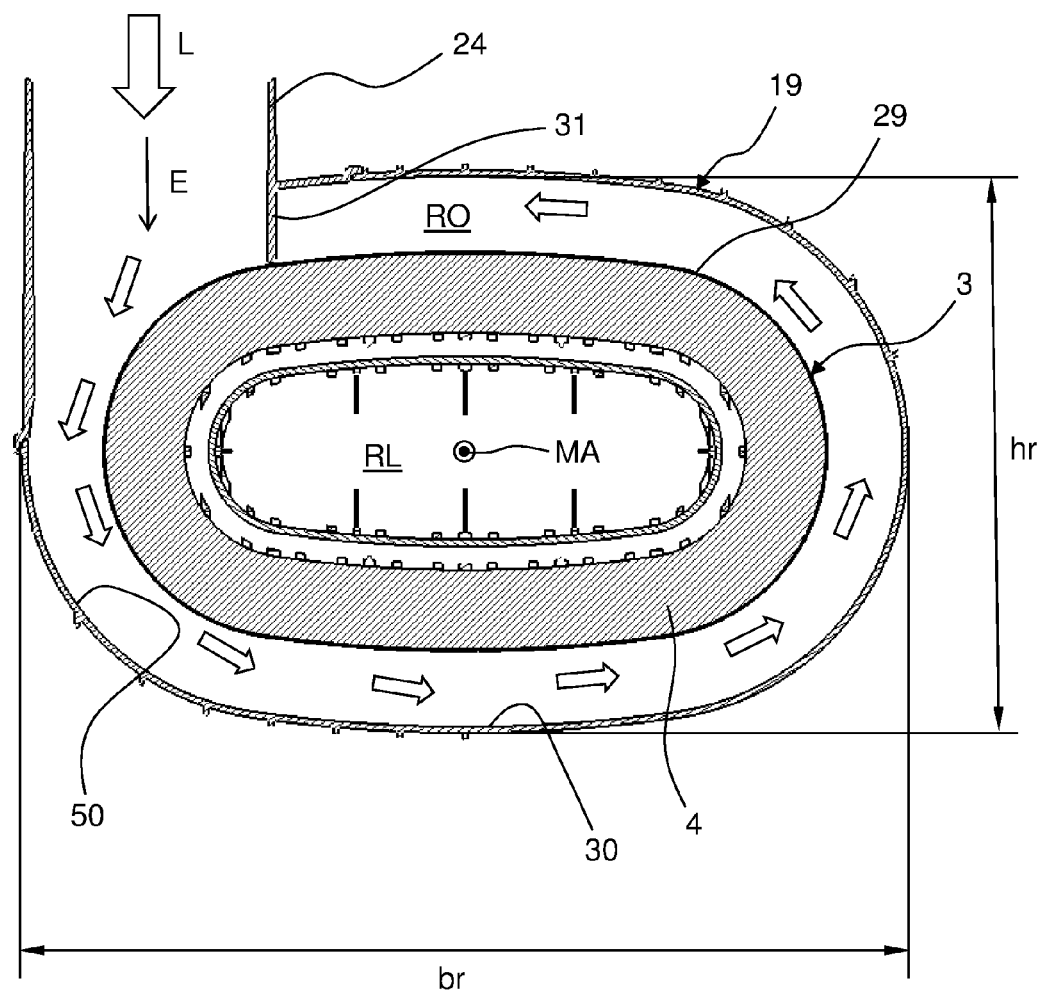
FIG. 9 shows a schematic sectional view of the filter arrangement according to sectional line IX-IX of FIG. 8.

FIG. 8 shows the filter arrangement 1 in a schematic side view. As FIG. 9 shows in a schematic sectional view along the sectional line IX-IX of FIG. 8, the fluid inlet 24 is arranged such that the inflow direction E of the fluid L is oriented in the direction of a lateral surface 29 and perpendicular to the longitudinal direction LR of the filter element 3 arranged in the receiving section 19. The lateral surface 29 forms an encasement end of the filter body 4. A cylindrical, particularly oval-cylindrical geometry of the filter element 3 is formed by the end plates 7, 8 and the lateral surface 29. The fluid L to be filtered flows around the filter element 3 that can be received in the receiving section 19 such that particles contained in the fluid L to be filtered can be removed at a wall 30 of the filter holder 2 or of the receiving section 19 with the aid of centrifugal force. The receiving section 19 thus acts as a centrifugal separator. Particularly, the inflow direction E is oriented such that the fluid L to be filtered flows against the filter element 3 in a substantially tangential manner. The receiving section 19 preferably has a latitudinal direction br and a vertical direction hr. The width-to-height ratio br/hr is preferably at least 4:3, more preferably at least 3:2, particularly at least 2:1, and/or at most 6:1, preferably at most 4:1, especially preferably at most 3:1 or 2:1. For the purpose of optimized pre-separation, ratios of less than 3:1 and preferably less than 2:1 or even less than 1.5:1 are advantageous. Preferably, the fluid inlet 24 is arranged such that the inflow direction E is oriented perpendicular to the latitudinal direction br, i.e., preferably perpendicular to the direction of the broader extension.

As a result of the fact that the fluid inlet 24 is oriented such that the inflowing fluid L strikes a relatively more pronouncedly curved curvature 50 of the wall 30 of the receiving section 19, the fluid L to be filtered is greatly accelerated and then flows around the filter element 3 tangentially and particularly in the manner of a screw, spiral or helix. As a result, good particle separation from the fluid L is achieved. The fluid inlet 24 can be shielded with the aid of a wall 31 from the fluid L flowing around the filter element 3, which supports the formation of a helical flow. The separated particles are removed from the receiving section 19 with the aid of the particle discharge opening 26. The receiving section 19 runs in the longitudinal direction LR of the filter element 3 parallel to the lateral surface 29 of the filter element 3 so that, as shown in FIG. 10, a constant distance a is provided between the filter element 3 and the wall 30 perpendicular to the longitudinal direction LR around the filter element 3.

Figure 11:
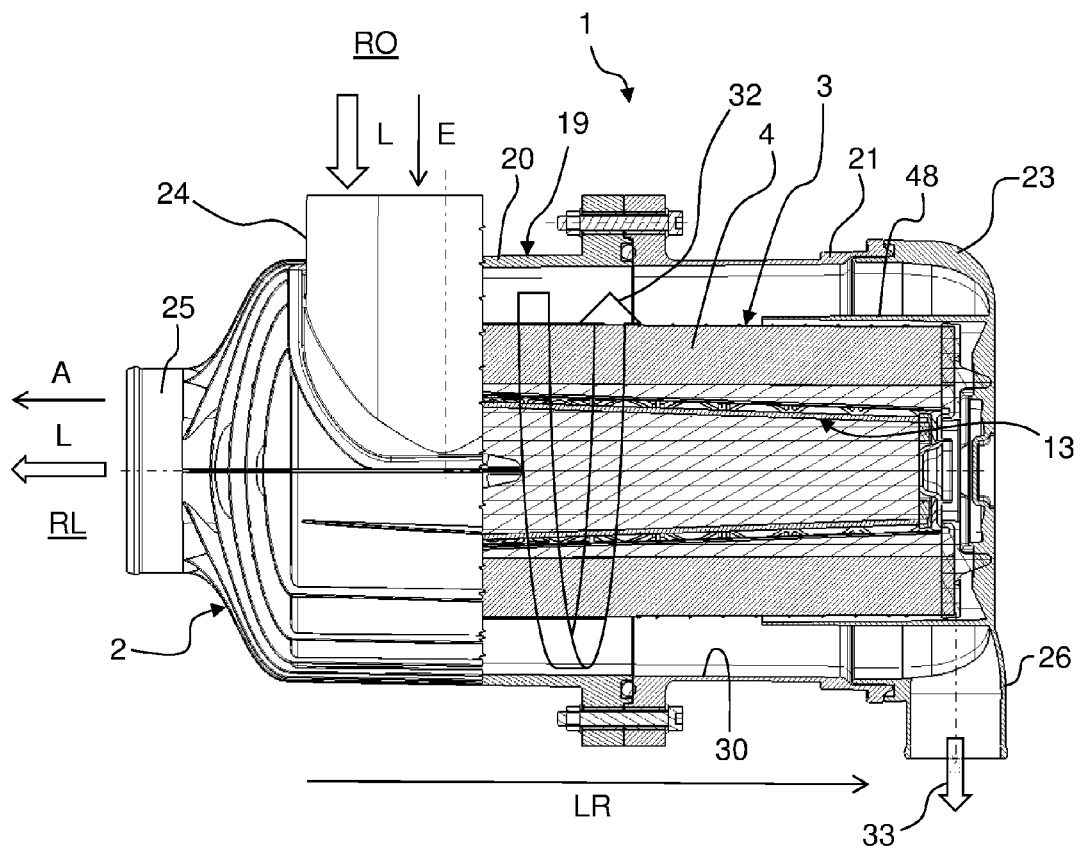
FIG. 11 shows a schematic partial sectional view of the filter arrangement according to FIG. 1.

FIG. 11 shows a partial sectional view of the filter arrangement 1. The fluid L to be filtered flows through the fluid inlet 24 into the receiving section 19. As a result of the fact that the inflow direction E of the fluid L to be filtered is oriented in the direction of the lateral surface 29 of the filter element 3 and is particularly also positioned perpendicular to the longitudinal direction LR, the fluid L to be filtered flows, as shown in FIG. 11 with the aid of an arrow 32, helically around the filter element 3 and through the filter body 4 of the filter element 3 in order to flow again as a filtered fluid L out of the fluid outlet 25 of the filter holder 2 in the outflow direction A. When the filter element 3 is flowed around, particles 33 are separated from the fluid L to be filtered on the wall 30 of the receiving section 19 with the aid of centrifugal force that can be removed from the receiving section 19 via the particle discharge opening 26. The particles 33 can fall out of the particle discharge opening 26, for example, or be sucked out of same. In comparison to a circular cross section, the oval-shaped cross-sectional geometry of the receiving section 19 results in favorable particle separation while at the same time rendering the system suitable for installation spaces with non-circular or square cross section.

As FIG. 11 also shows, the maintenance cover 23 has a tubular, particularly oval-tubular incident-flow guard 48 in which the filter element 3 is received at least partially, preferably such that a flow gap of several millimeters is produced between filter element and incident-flow guard. The incident-flow guard 48 can be embodied in a materially integral manner with the maintenance cover 23 and, in particular, prevents particles pre-separated by the rotating flow from striking the filter body 4, for example through gravitational effects.

Figure 12:
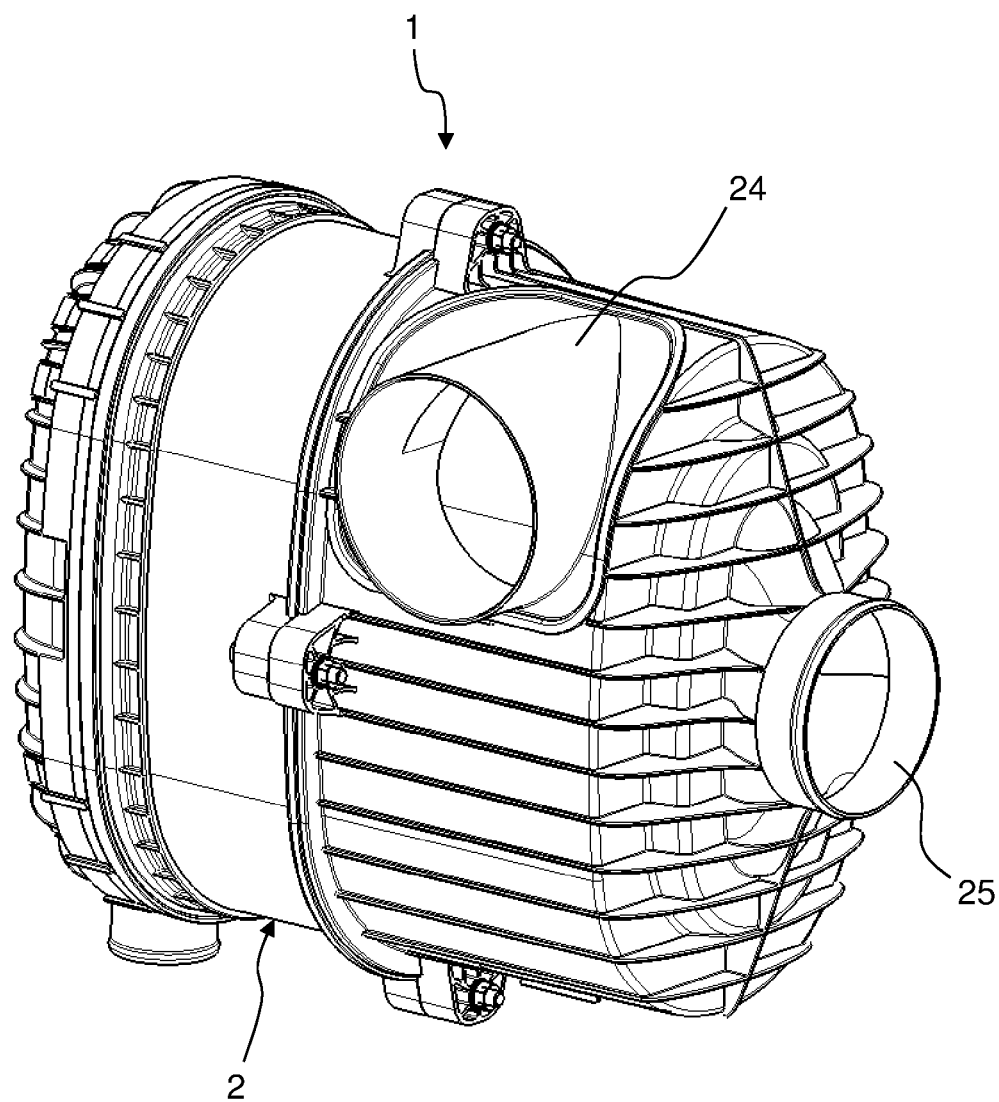
FIG. 12 shows a schematic, perspective view of another embodiment of a filter arrangement.

FIG. 12 shows a schematic, perspective view of another embodiment of a filter arrangement 1. The embodiment of the filter arrangement 1 according to FIG. 12 differs from the embodiment of the filter arrangement according to FIG. 1 merely in that the fluid inlet 24 does not have an oval-shaped but a circular cross section.

Figure 13:
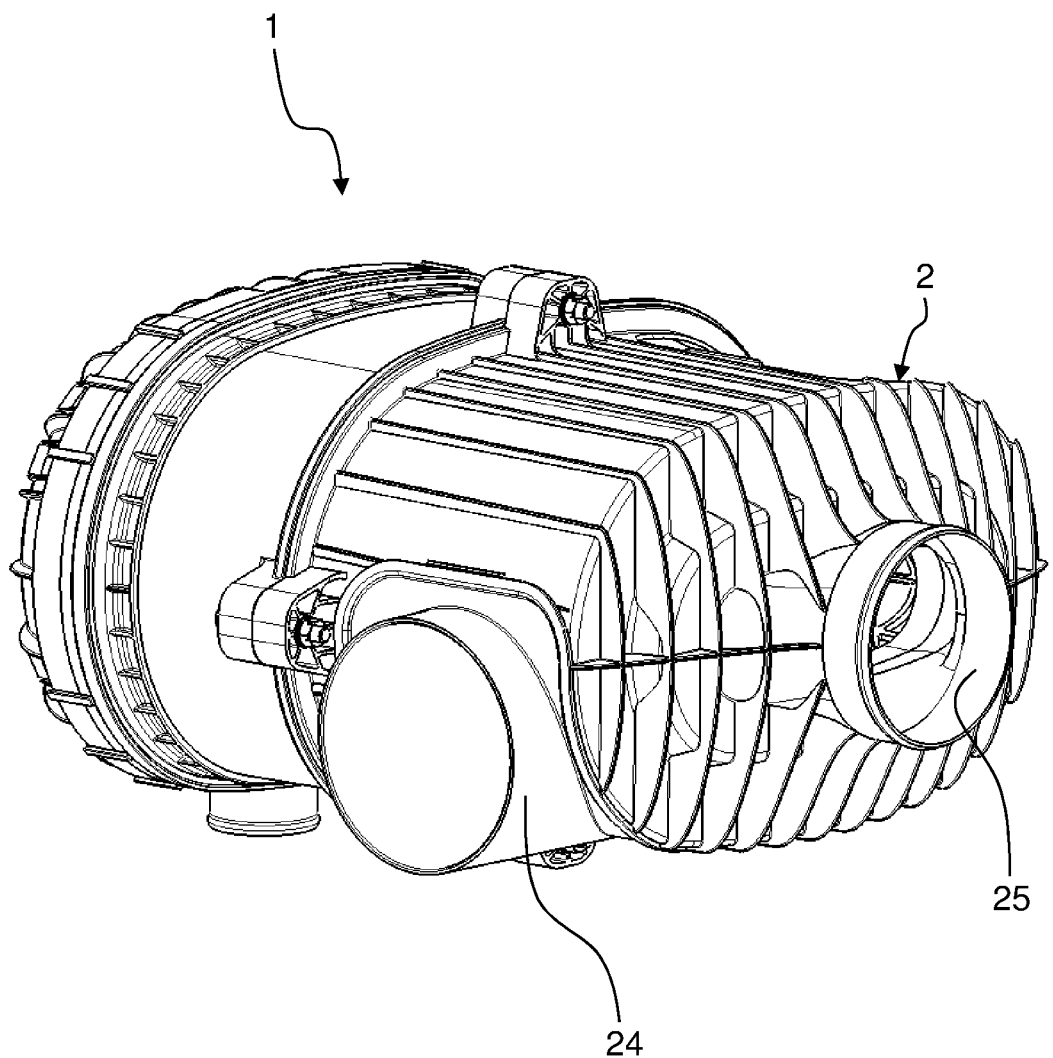
FIG. 13 shows a schematic, perspective view of another embodiment of a filter arrangement.

FIG. 13 shows a schematic, perspective view of another embodiment of a filter arrangement 1. The embodiment of the filter arrangement 1 according to FIG. 13 differs from the embodiment of the filter arrangement 1 according to FIG. 12 in that the fluid inlet 24 is positioned such that the inflow direction E of the fluid L to be filtered is arranged perpendicular to the direction of the narrower extension and not perpendicular to the latitudinal direction br thereof.

Figure 14:
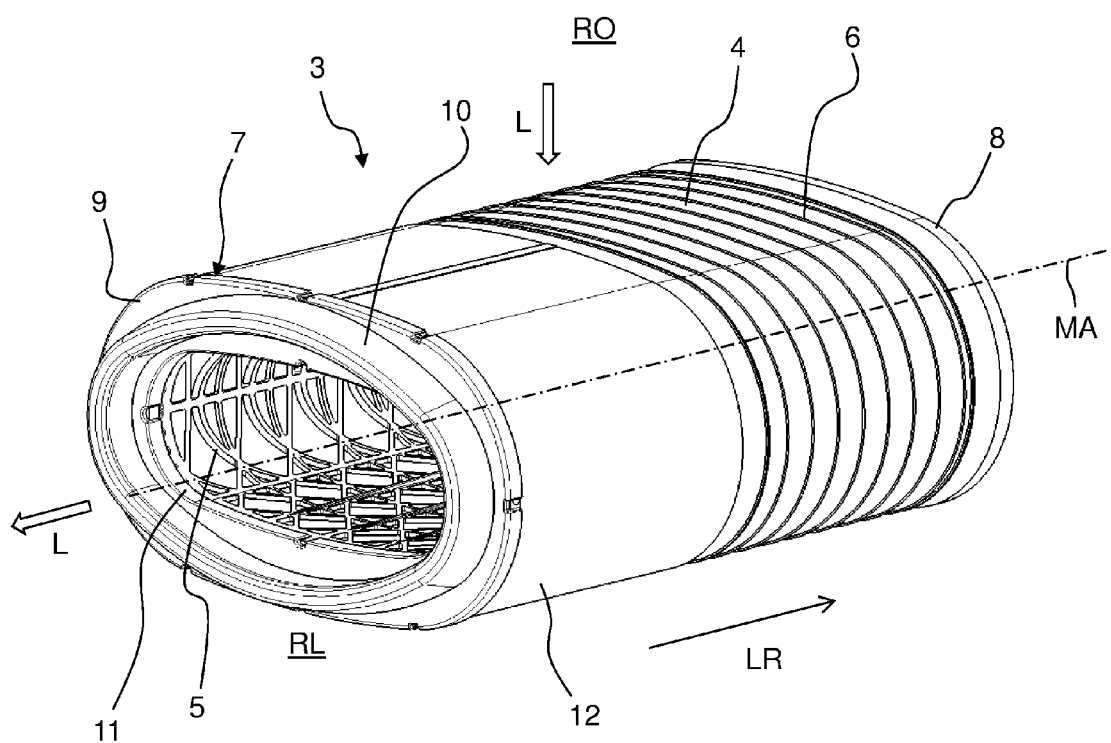
FIG. 14 shows a schematic, perspective view of another embodiment of a filter element.
Figure 15:
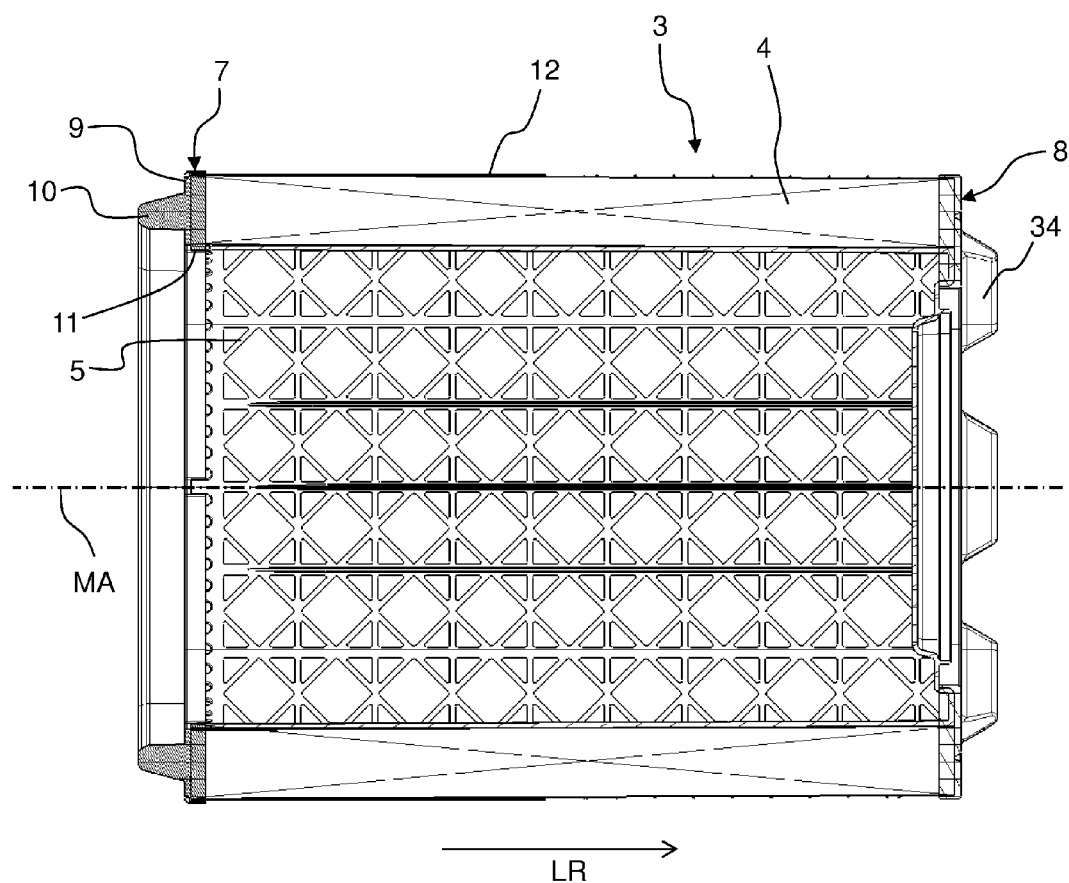
FIG. 15 shows a schematic sectional view of the filter arrangement according to FIG. 14.
Figure 16:
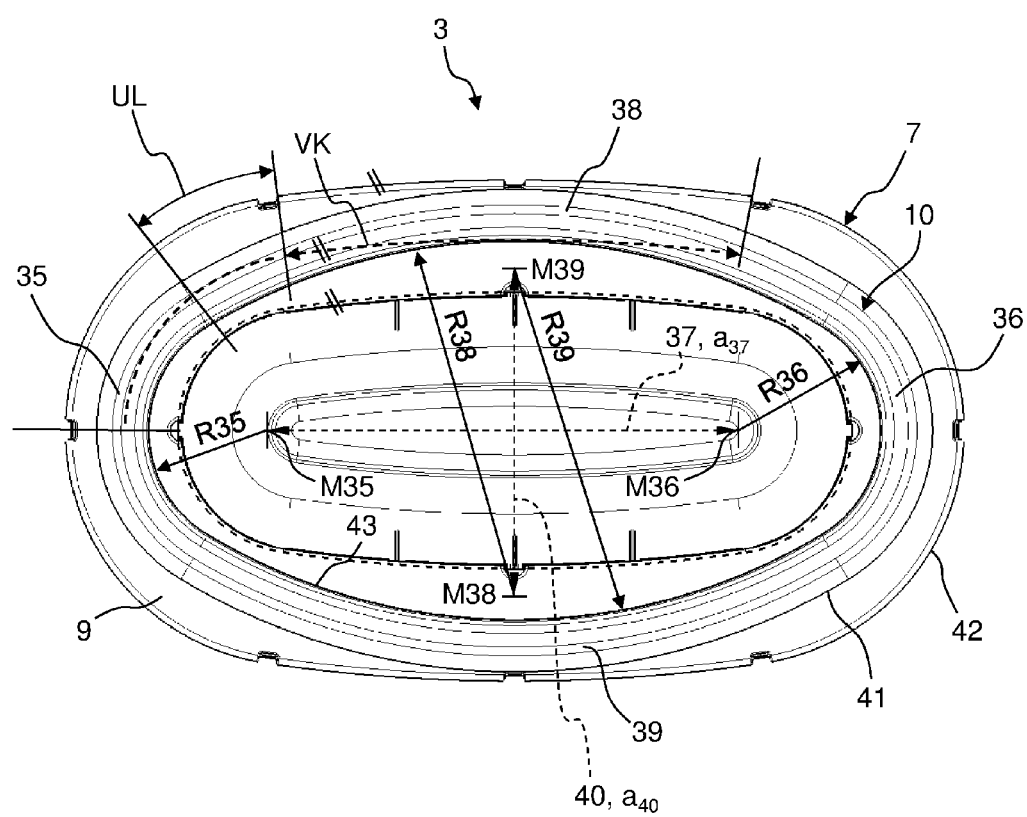
FIG. 16 shows a schematic view of the filter arrangement according to FIG. 14.

FIG. 14 shows a schematic, perspective view of another embodiment of a filter element 3. FIG. 15 shows a sectional view of the filter element 3, and FIG. 16 shows a front view of the filter element 3. In the following, reference is made simultaneously to FIGS. 14 to 16.

The construction of the filter element 3 according to FIGS. 14 to 16 corresponds substantially to the construction of the filter element 3 according to FIG. 6. The filter element 3 has a first end plate 7 and a second end plate 8. A folded filter body 4 is positioned between the end plates 7, 8. The end plates 7, 8 are preferably made of cast, particularly foamed polyurethane which encloses the filter body in a sealing and form-fitting manner at its axial ends. However, the end plates 7, 8 can also be made of other materials such as injection-molded thermoplastic plastic and be fused, welded or adhered to the filter body 4, for example. The filter body 4 surrounds a lattice-like center tube 5 or a winding core. To filter fluid L to be filtered, it flows from an unfiltered side RO of the filter element 3 through the filter medium of the filter body 4 to a filtered side RL of the filter element 3. The first end plate 7 has a receiving opening 11 for receiving a secondary element 13 through which the filtered fluid also flows according to FIG. 7.

The end plates 7, 8 are preferably oval-shaped. The filter body 4 can be partially covered by an incident-flow guard 12. The incident-flow guard 12 can be a fine-meshed screen or a film that is welded, adhered or fused to the filter medium. In particular, the incident-flow guard 12 adjoins the first end plate 7. The incident-flow guard 12 prevents particles 33 contained in the fluid L to be filtered entering through the fluid inlet 24 from striking the filter medium directly.

The second end plate 8 is preferably fluid-tight, whereby no fluid L can pass from the unfiltered side RO to the filtered side RL of the filter element 3. The second end plate 8 can have clamping elements 34, for example, only one of which is provided with a reference symbol in FIG. 15. These can be embodied as elastically deformable extensions projecting in the longitudinal direction LR from the end plate 8 that, during the installation of the maintenance cover 23, can be supported on same and are elastically biased through the installation of the maintenance cover 23. The number of clamping elements 34 is arbitrary. With the aid of the elastically deformable clamping elements 34, the filter element 3 can be optimally positioned in the receiving section 19 of the filter holder 2 with respect to a longitudinal direction LR of the filter element 3. The clamping elements 34 also serve to provide vibration damping and/or tolerance compensation. The second end plate 8 is preferably embodied in a materially integral manner with the clamping element 34. For example, the second end plate 8 can be made of a polyurethane foam.

A sealing device 10 for sealing the filter element 3 with respect to the receiving section 19 is provided on the first end plate 7 and particularly on a front side 9 of the first end plate 7 facing away from the filter body 4. The sealing device 10 can be deformed in a spring-biased manner. Preferably, the first end plate 7 and the sealing device 10 are embodied in a materially integral manner. For example, the first end plate 7 and the sealing device 10 can be made of a polyurethane foam. The sealing device 10 runs completely around the first end plate 7. The sealing device 10 is located completely within the cross section of the filter body 4, particularly projected in the longitudinal direction LR.

As shown in FIG. 16, the sealing device 10 has two first convex curved sections 35, 36 arranged opposite from one another. The first curved sections 35, 36 each have a first radius of curvature R35, R36. The radii of curvature R35 and R36 are preferably of equal size. The radii of curvature R35 and R36, respectively, have curvature midpoints M35 and M36, respectively. The curvature midpoints M35 and M36 lie on a common line 37.

The sealing device 10 still has two second convex curved sections 38, 39 arranged opposite from one another. The first curved sections 35, 36 and the second curved sections 38, 39 are interconnected in a materially integral manner. The second curved sections 38, 39 have second radii of curvature R38, R39. The second radii of curvature R38, R39 are equal. The curvature midpoints M38 and M39 of the radii of curvature R38 and R39 lie on a common line 40. The line 40 is perpendicular to the line 37. The line 37 has a length $a_{37}$ and the line 40 has a length $a_{40}$. Preferably, the line 40 bisects the line 37 and vice versa. Preferably, the line 40 and the line 37 intersect at a midpoint through which a center axis MA of the filter element 3 runs in the longitudinal direction LR that preferably overlaps with a center axis of the filter holder 2 when the filter element 3 is installed in the filter holder 2. The sealing device 10 still has an outer contour 41. The outer contour 41 does not run parallel to an outer contour 42 of the first end plate 7. The second radii of curvature R38, R39 are greater than the first radii of curvature R35, R36. The secondary element 13 can have a similarly embodied sealing device 18.

It can be seen in FIG. 16 how the contour of the sealing device 10 runs in comparison to a comparative curve VK. In the embodiment specifically shown, and as also especially preferred, the comparative curve VK runs parallel to the outer and/or inner contour of the filter body 4 and to the outer and/or inner contour of the open end plate 7 and is more preferably concentric with respect thereto. In the center of the second curved sections 38, 39, the comparative curve has the same distance to the outer and inner contour of the filter body 4 and to the outer and inner contour of the open end plate 7 as the inner surface 43. As can also be seen from FIG. 16, the sealing device 10 has a more pronounced curvature in its second curved section 38 than the comparative curve VK. Expressed in another way, in its center, the second curved section 38 of the sealing device 10 is at a shorter distance (preferably the shortest) distance to the outer contour of the end plate 7 and of the filter body 4 than in the area of the transition from the second curved sections 38, 39 to the first curved sections 35, 36. As can also be seen from FIG. 16, the above-described geometry has the effect that the second curved sections 38, 39 of the sealing device 10 project in an area of overlap into the curved sections of the end plate 7 and of the filter body 4 having a more pronounced curvature. In this area of overlap UL, the distance of the sealing device 10 or inner surface 43 from the outer contour of the end plate 7 or filter body 4 is at the maximum. In this way, the width of the end plate 7 can be exploited in order to achieve maximally pronounced curvature on the sealing device 7 [sic] and thus a good sealing effect.

Figure 17:
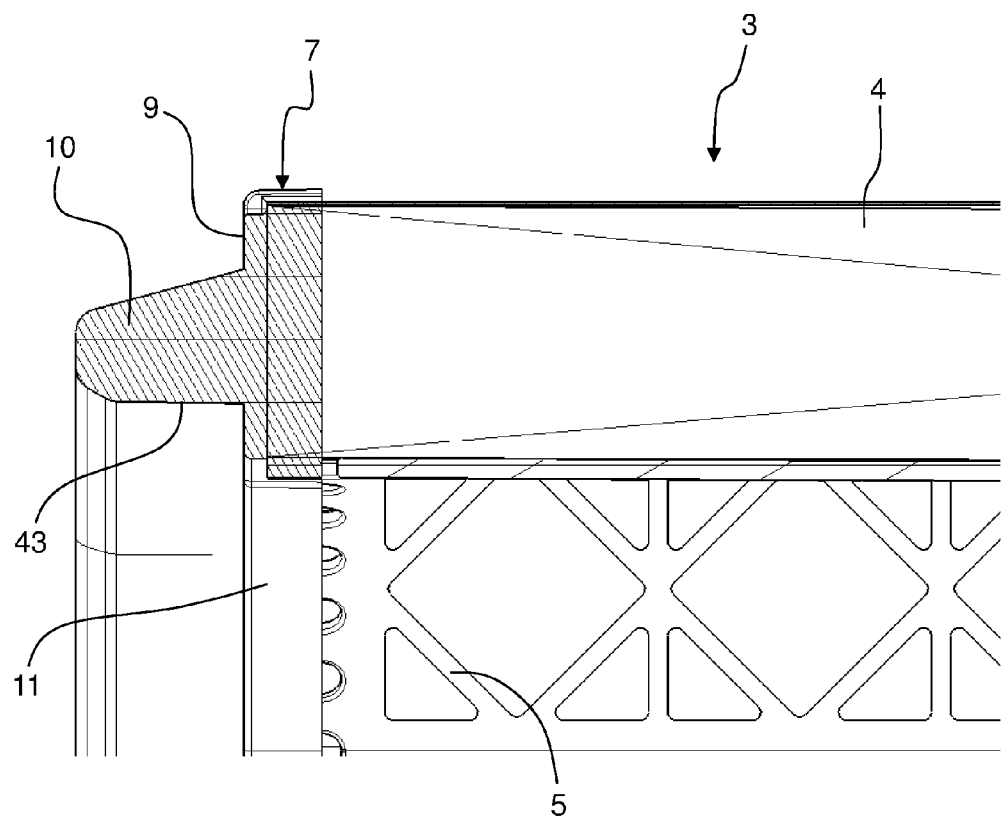
FIG. 17 shows a schematic partial sectional view of the filter arrangement according to FIG. 14.
Figure 18:
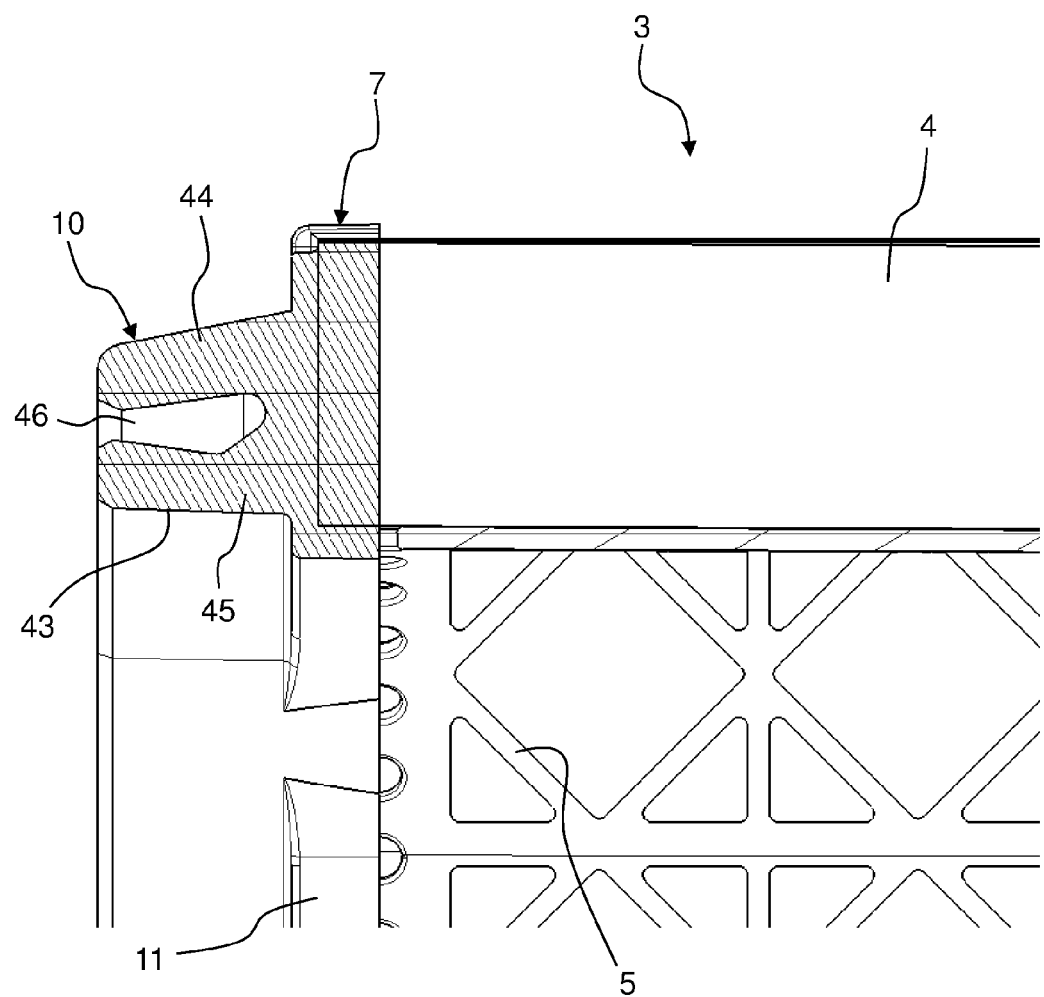
FIG. 18 shows a schematic, partial sectional view of another embodiment of a filter element.

As shown in FIGS. 17 and 18, the sealing device 10 has an oval-cylindrical inner surface 43 which forms the sealing surface and abuts in a sealing manner against the engagement area 27 of the receiving section 19 of the filter holder 2, particularly against a corresponding seal contact surface, when the sealing device 10 engages in the engagement area 27. Upon engaging in the engagement area 27, the sealing device 10 is deformed in a spring-biased manner, particularly widened, particularly such that the bias of the sealing device 10 against the engagement area 27 is produced exclusively by the spring-biased deformation. The inner surface 43 abuts in a flat and sealing manner against the engagement area 27. With the aid of the curved sections 35, 36, 38, 39, a constant contact pressure of the inner surface 43 against the engagement area 27 is achieved around the periphery. Furthermore, as shown in FIG. 17, the sealing device 10 can have an approximately rectangular geometry in cross section. Moreover, as shown in FIG. 18, the sealing device 10 can have two lip seals 44, 45 between which a groove-shaped cavity 46 is arranged. As a result, a sealing device 10 that is better protected from external influences by having a tubular bar on the filter holder side engage in the groove-shaped cavity such that the inner and/or outer lip seal can be placed in a sealing manner against the tubular bar. The cavity 46 can preferably be opened axially for this purpose.

Figure 19:
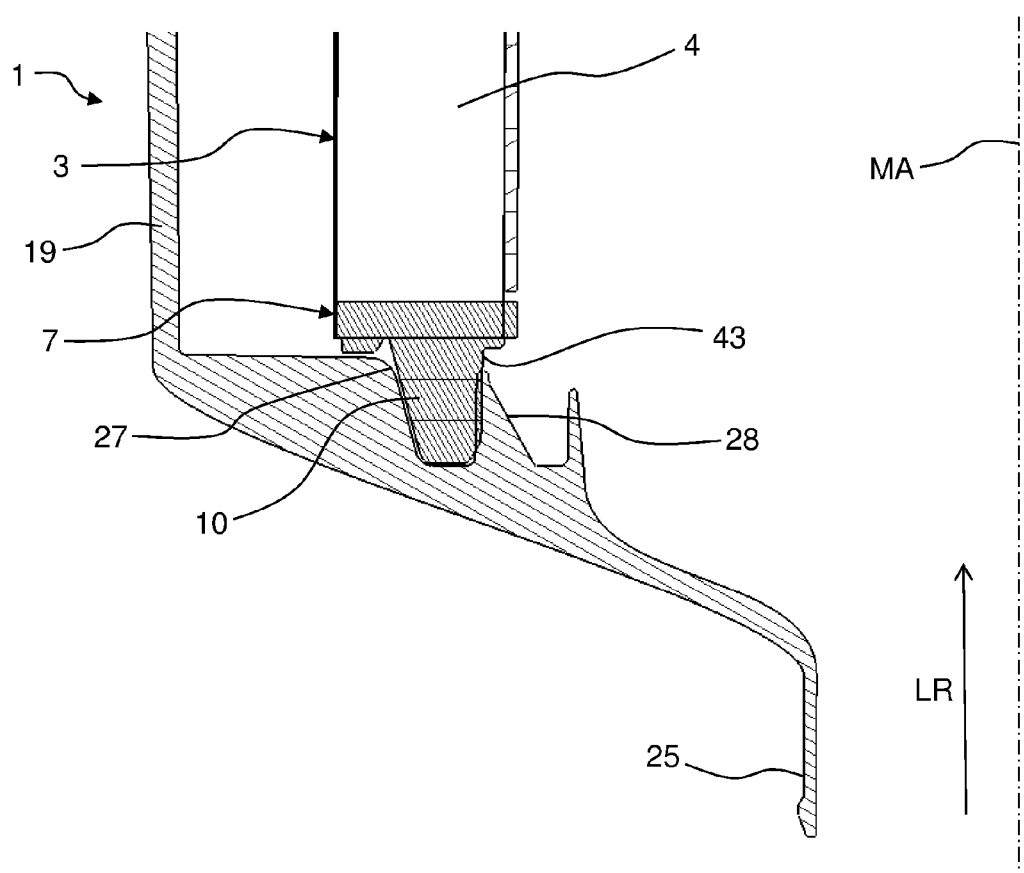
FIG. 19 shows a schematic, partial sectional view of another embodiment of a filter arrangement.
Figure 32:
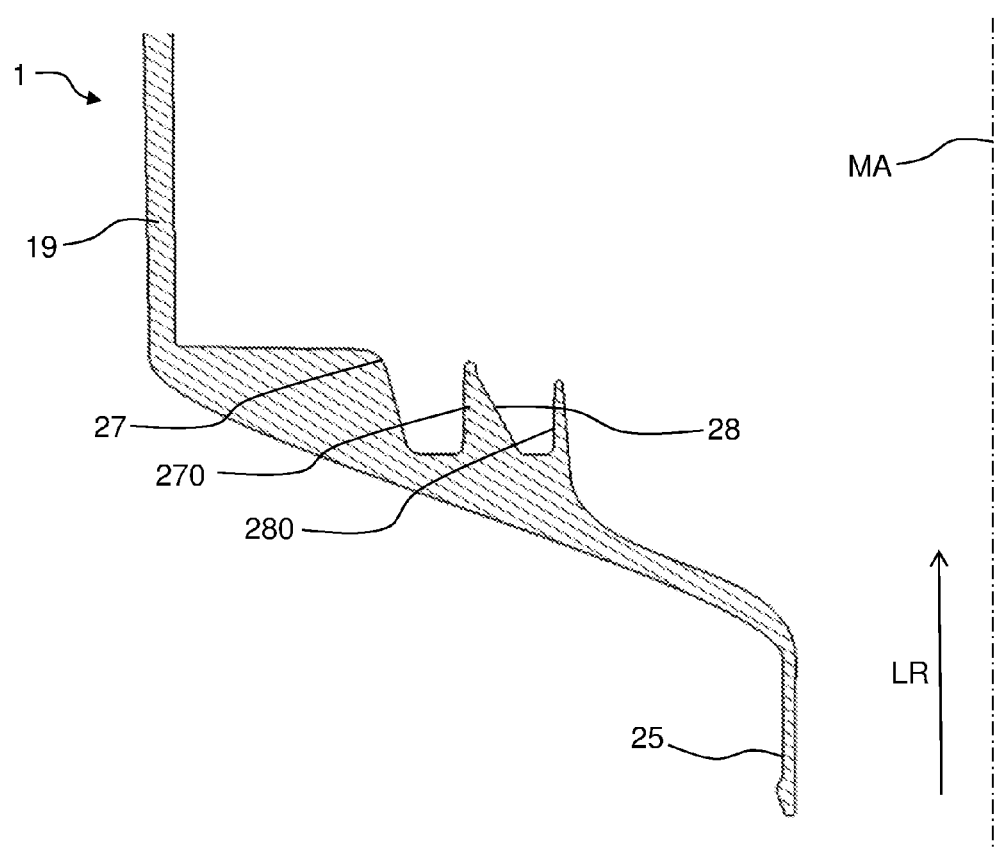
FIG. 32 shows a schematic partial sectional view of the embodiment of a filter arrangement according to FIG. 19 in which the filter element is not shown.

As shown in detail in FIG. 19 and FIG. 32, the sealing device 10 engages in the engagement area 27 of the receiving section 19. The inner surface 43 abuts in a flat and sealing manner against the engagement area 27, particularly a radially outwardly oriented, oval-cylindrical seal contact surface 270 (see FIG. 32). The sealing device 10 thus seals the filter element 3 radially inward with respect to the receiving section 19. "Inward" is to be understood here as a direction pointing toward the fluid outlet 25.

Figure 20:
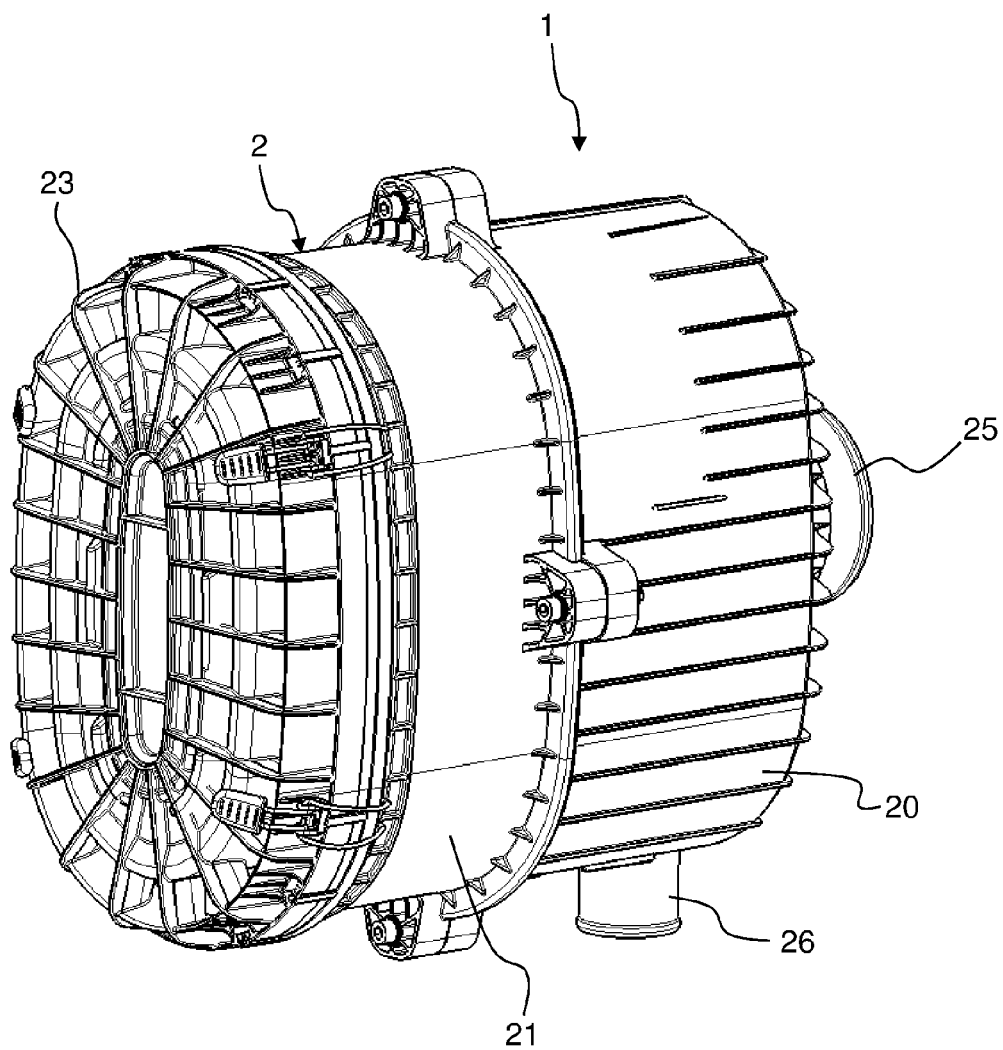
FIG. 20 shows a schematic, perspective view of another embodiment of a filter arrangement.
Figure 21:
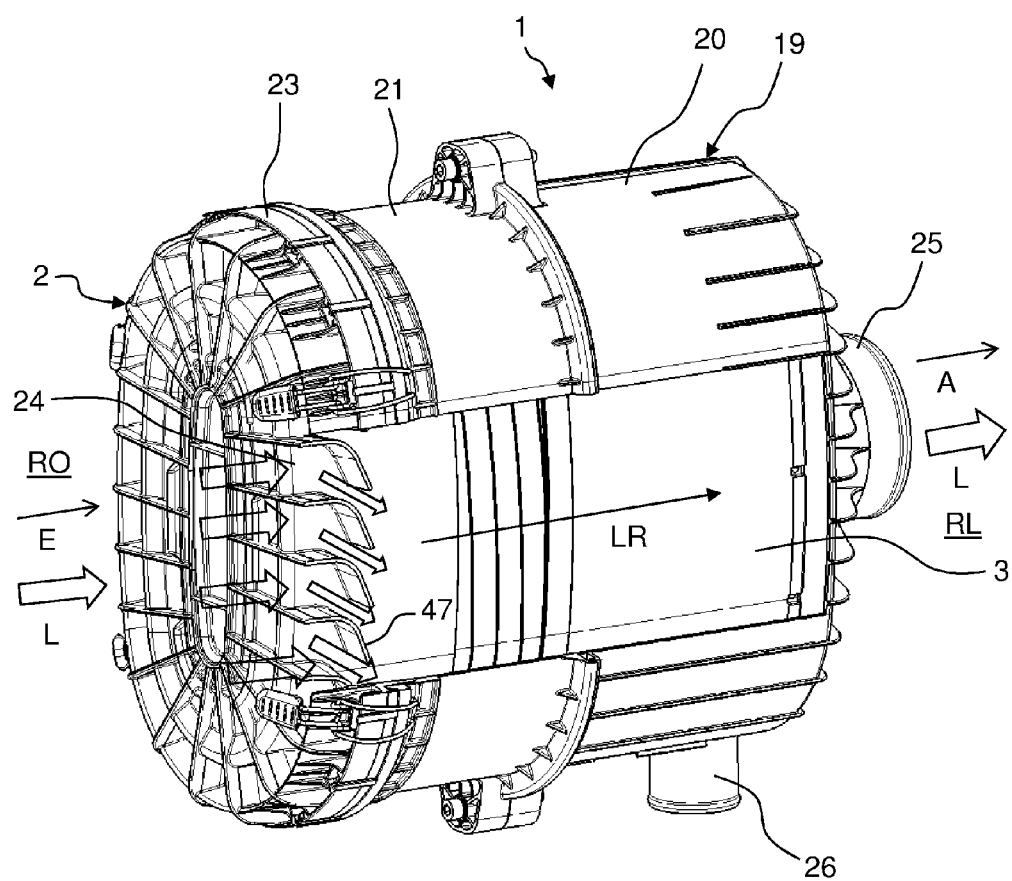
FIG. 21 shows a schematic, perspective partial sectional view of the filter arrangement according to FIG. 20.
Figure 22:
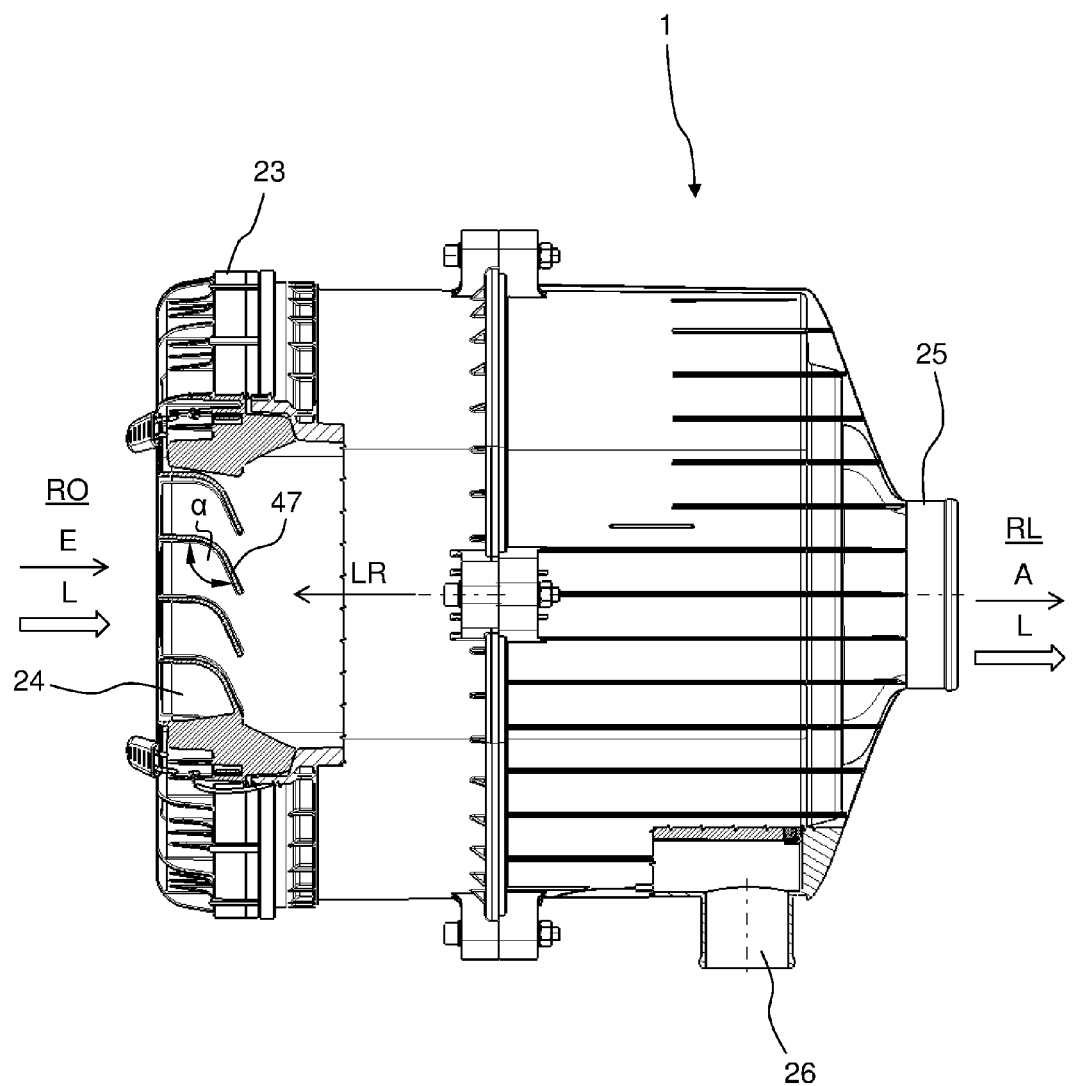
FIG. 22 shows a schematic partial sectional view of the filter arrangement according to FIG. 20.

FIG. 20 shows a schematic, perspective view of another embodiment of a filter arrangement 1. FIG. 21 shows the filter arrangement 1 according to FIG. 20 in a schematic partial sectional view. The filter arrangement 1 comprises a filter holder 2 and a filter element 3 arranged in the filter holder 2. A fluid inlet 24 of the filter holder 2 is oriented such that an inflow direction E of fluid L to be filtered is oriented in the direction of a longitudinal direction LR of the filter element 3. The fluid inlet 24 is preferably arranged on a maintenance cover 23 of the filter holder 2. Any number of fluid inlets 24 can be provided.

Figure 23:
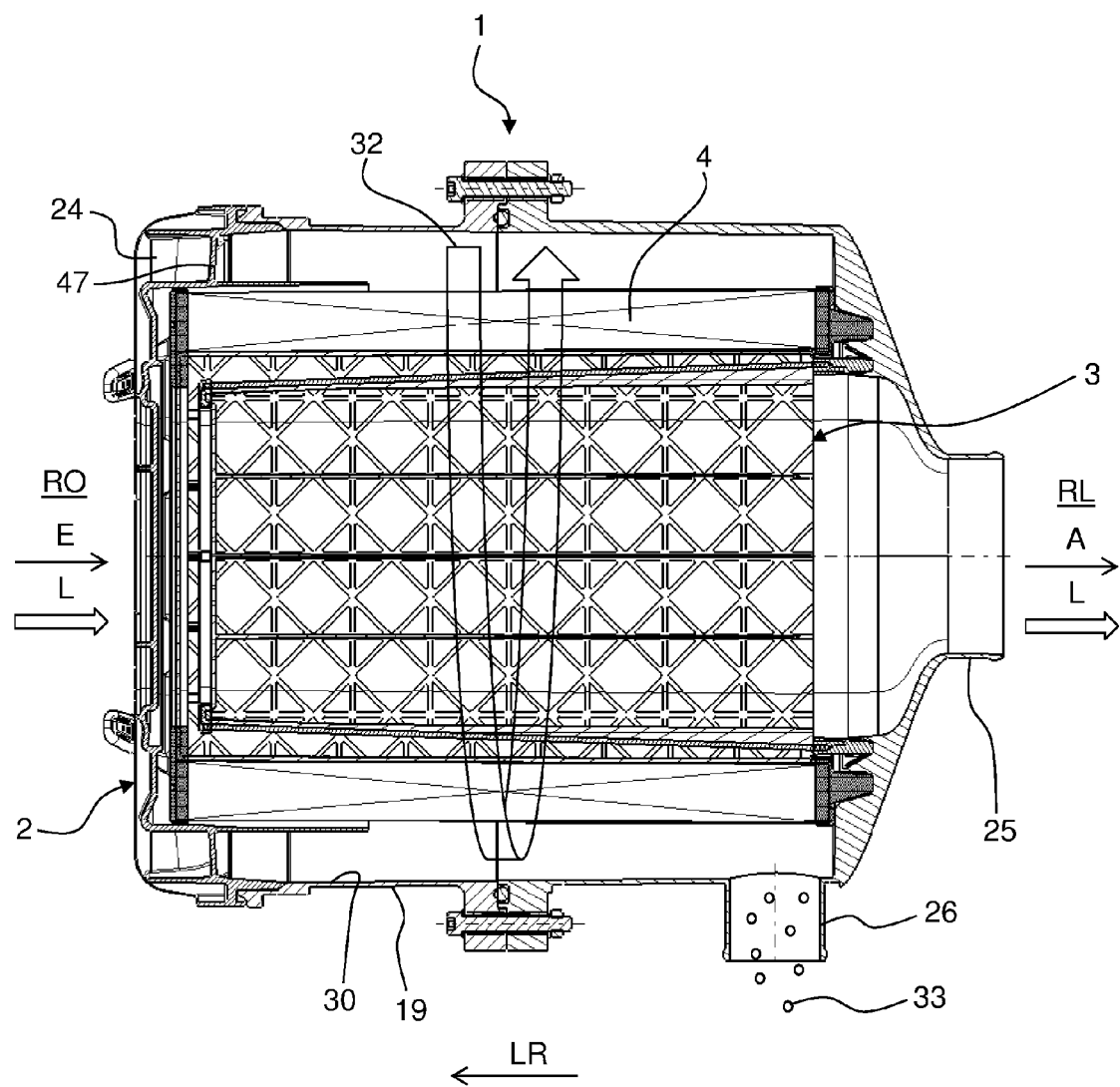
FIG. 23 shows a schematic sectional view of the filter arrangement according to FIG. 20.

As shown in FIGS. 21 to 24, each fluid inlet 24 has a guide member 47 for deflecting the fluid L. Each guide member 47 has an angle of curvature α. The guide members 47 are set up for the purpose of deflecting the inflowing fluid L to be filtered such that, as shown in FIG. 23 with the aid of an arrow 32, it flows around the filter element 3 in a helical manner. The filter element 3 is flowed against tangentially. As a result, particles are separated on a wall 30 of a receiving section 19 of the filter holder 2 that can be discharged from the filter holder 2 via a particle discharge opening 26 of the filter holder 2.

Figure 24:
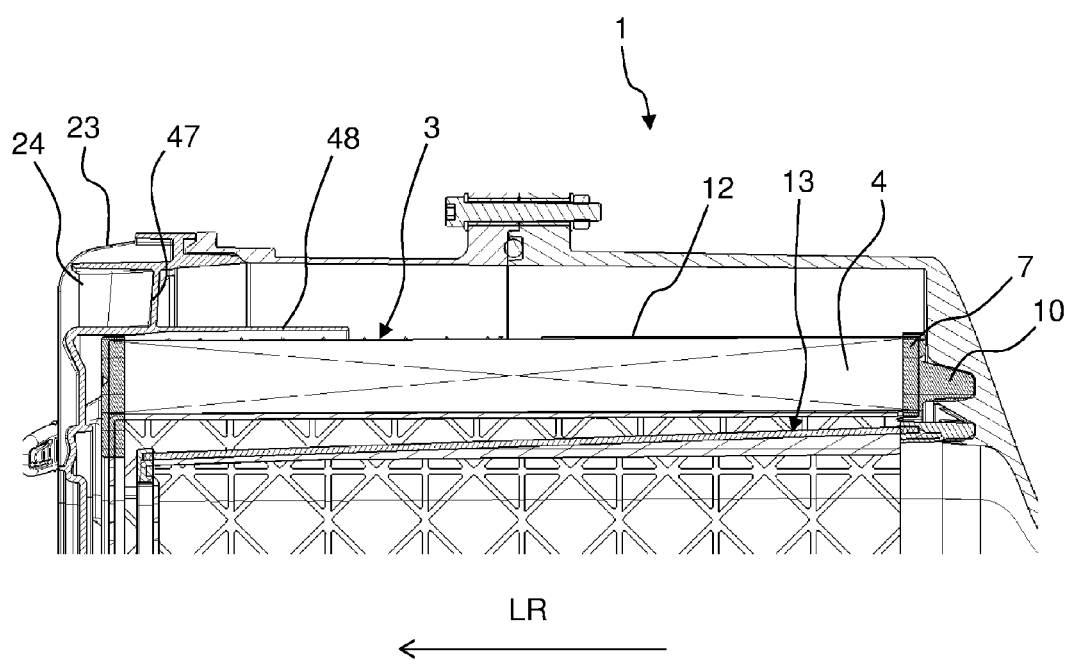
FIG. 24 shows a schematic partial sectional view of the filter arrangement according to FIG. 20.

The guide members 47 can be embodied as guide vanes. Preferably, any number of fluid inlets 24 is provided in a distributed manner around a periphery u (FIG. 25) of the filter holder 2. The angle of curvature a of the guide members 47 can be varied circumferentially around the filter element 3, particularly in order to generate a uniformly circumferential flow. The maintenance cover 23 can also have a tubular incident-flow guard 48 as shown in FIG. 24 that is embodied in a materially integral manner with the maintenance cover 23. The incident-flow guard 48 prevents the fluid L to be filtered from flowing directly against the filter element 3, particularly by separating the fluid inlets 24 from the filter element 3 in such a way that particles 33 are prevented from striking the filter medium directly.

Figure 25:
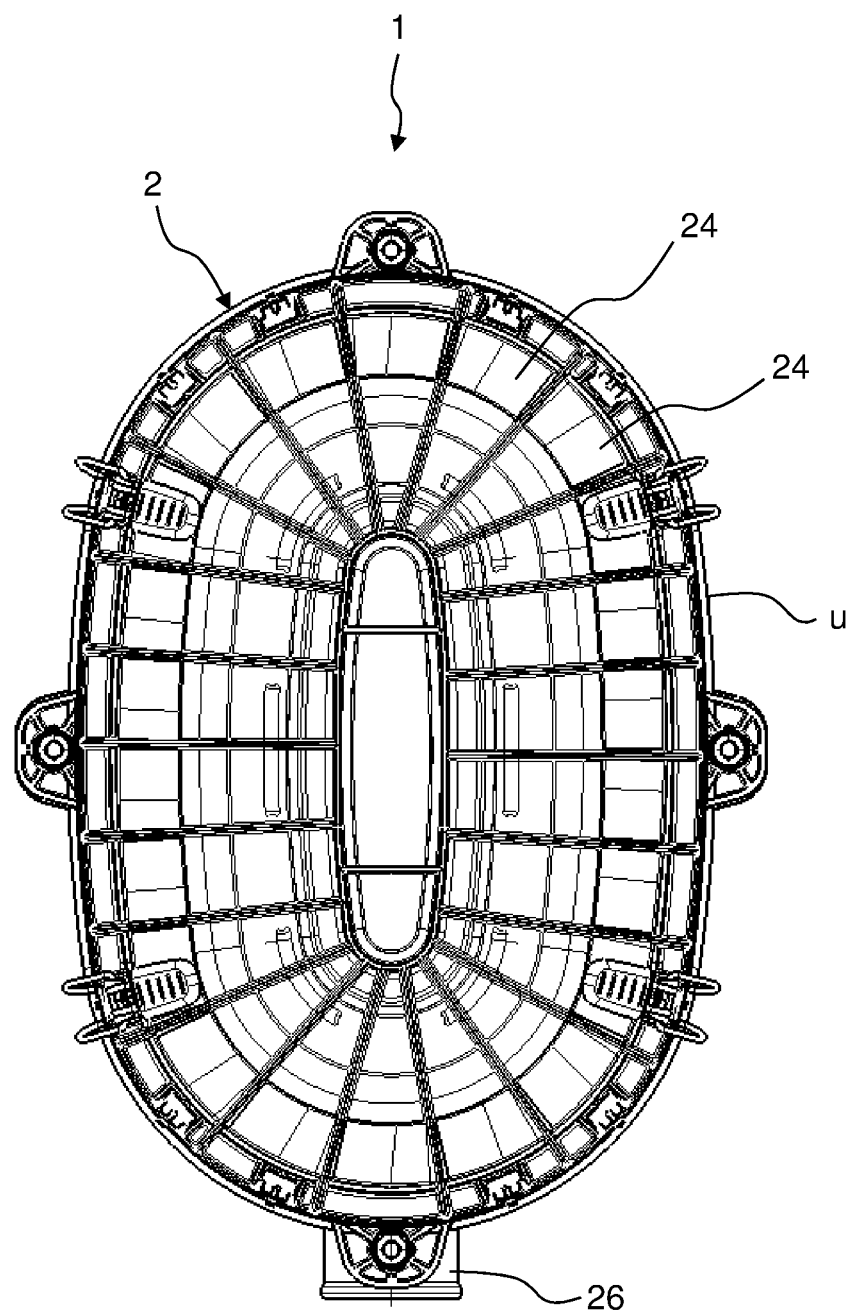
FIG. 25 shows a schematic view of the filter arrangement according to FIG. 20.

FIG. 25 shows a top view of the filter arrangement 1. As shown in FIG. 25, a plurality of fluid inlets 24 can be provided, only two of which are provided with reference symbols in FIG. 25. An opening cross section of the fluid inlets 24 can vary over the circumference u of the filter holder 2. For example, opening cross sections of the fluid inlets 24 can be greater or lesser in regions with pronounced curvature of the filter element 3 than in regions of the filter element 3 in which it has a slight curvature.

Figure 26:
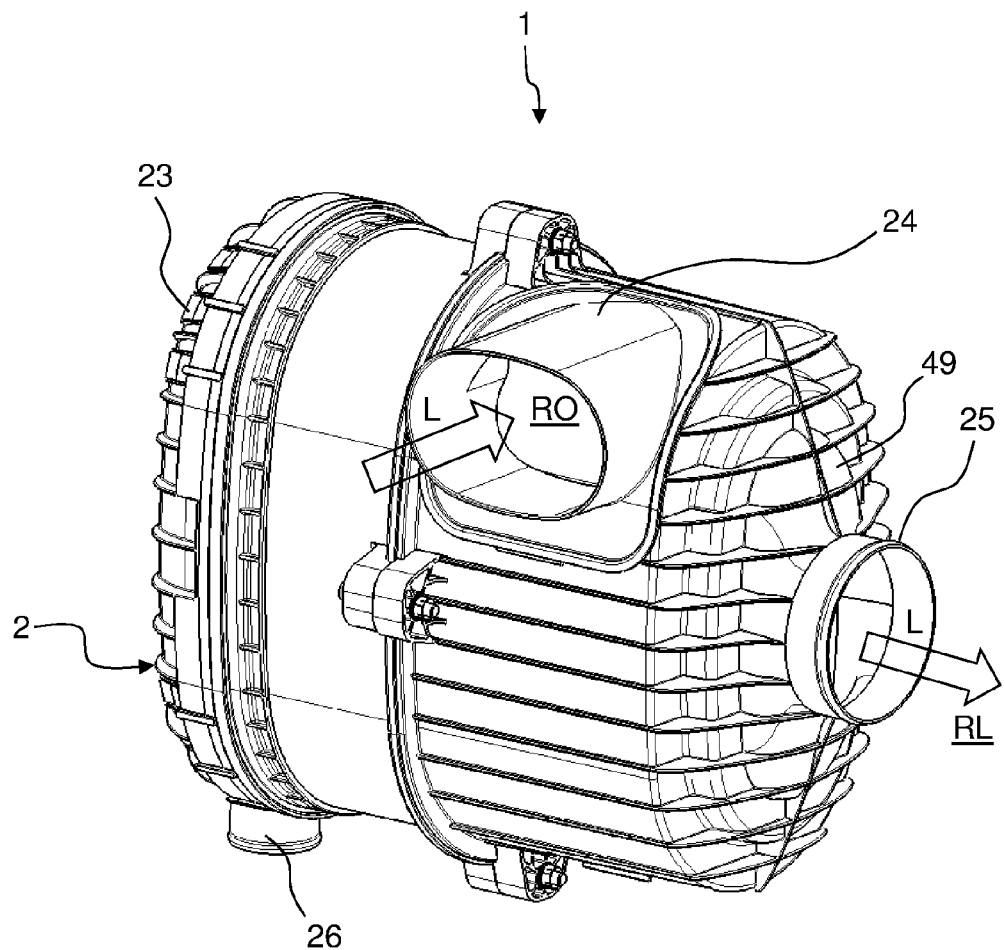
FIG. 26 shows a schematic, perspective view of another embodiment of a filter arrangement.
Figure 27:
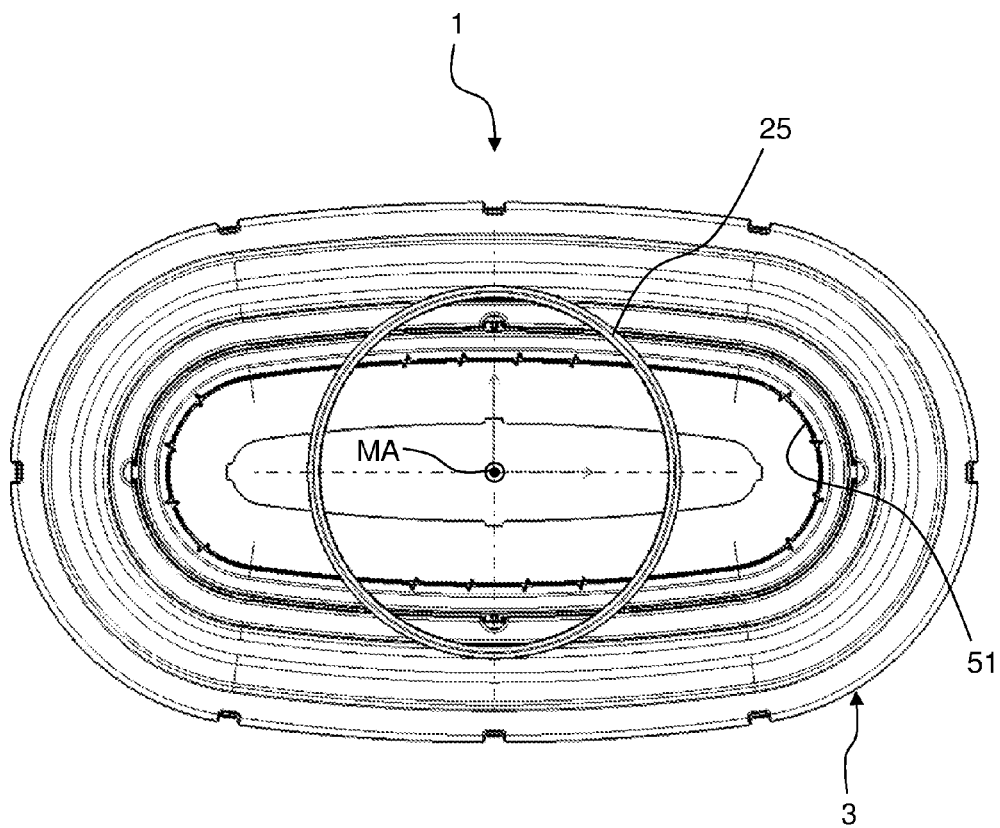
FIG. 27 shows a schematic view of the filter arrangement according to FIG. 26.

FIG. 26 shows a schematic, perspective view of another embodiment of a filter arrangement 1. FIG. 27 shows a rear view of the filter arrangement 1. The filter arrangement 1 comprises a filter holder 2. The filter holder 2 according to FIG. 26 differs from the filter holder 2 according to FIG. 1 through a modified transitional section 49.

Figure 28:
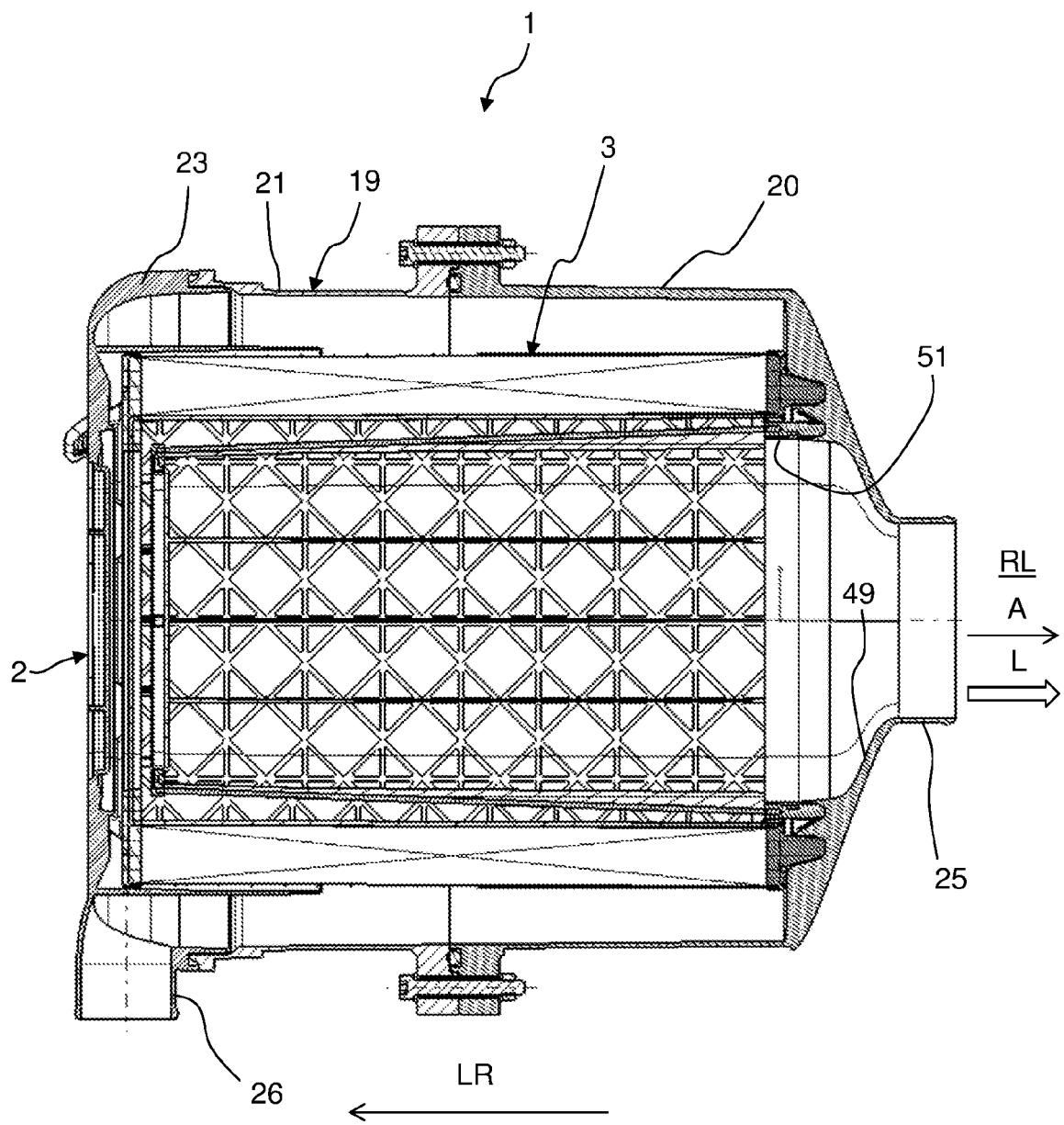
FIG. 28 shows a schematic sectional view of the filter arrangement according to FIG. 26.
Figure 29:
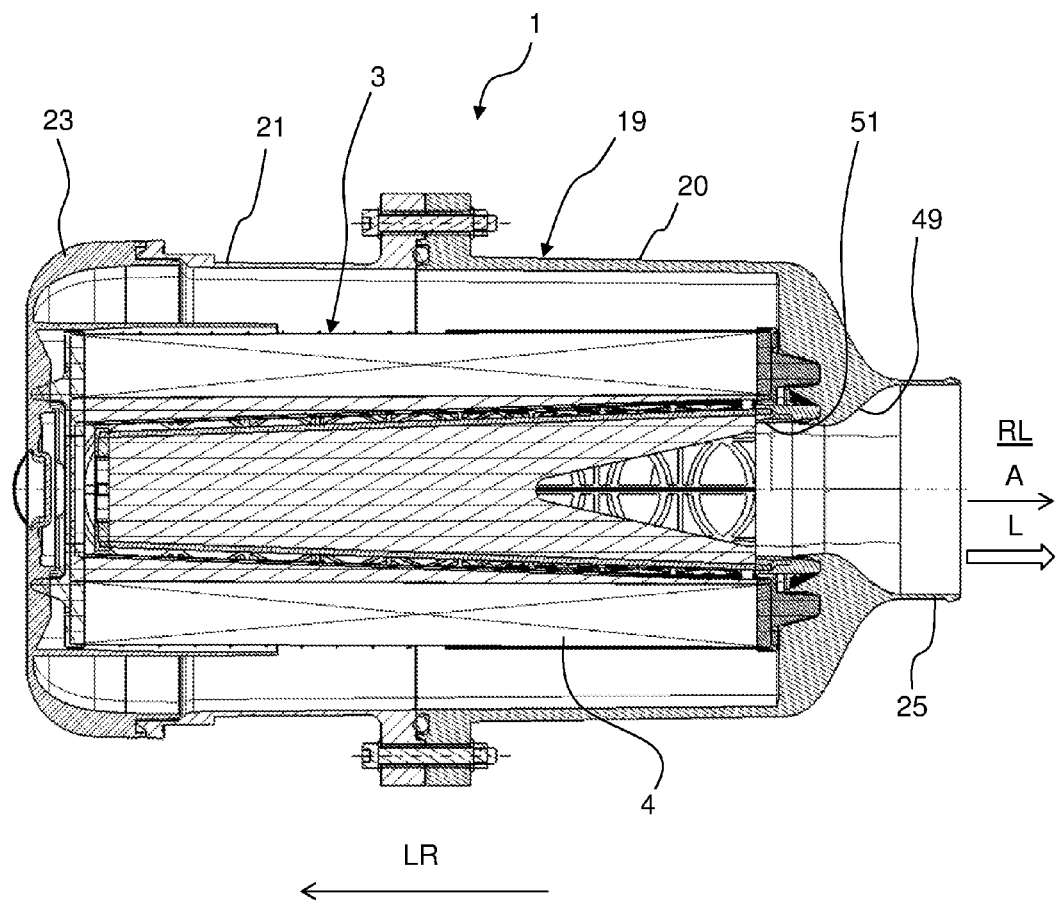
FIG. 29 shows a schematic sectional view of the filter arrangement according to FIG. 26.

As shown in FIG. 27, a fluid outflow opening 51 of the filter element 3 is oval-shaped, and a fluid outlet 25 of the filter holder 2 is circular. The fluid outlet 25 has a circular cross section facing away from the filter element 3 and an oval-shaped cross section facing toward the filter element 3. The circular cross section of the fluid outlet 25 on the side facing away from the filter element 3 preferably has a diameter that is greater than the small diameter of the oval-shaped cross section on the side of the fluid outlet 25 facing toward the filter element 3 and/or is greater than the diameter of the sealing device 18 in the smaller extension (in the vertical direction hr). As FIGS. 28 and 29 show in two schematic sectional views of the filter arrangement 1, a transition between the round fluid outlet 25 and the oval-shaped fluid outflow opening 51 of the filter element 3 is achieved through a curved transitional section 49 that is arranged between the fluid outlet 25 and the fluid outflow opening 51 of the filter element 3. One advantage of the oval-shaped geometry of the fluid outflow opening 51 of the filter element 3 is its large cross-sectional surface area. As a result, despite the narrowing between the fluid outlet 25 and the fluid outflow opening 51 of the filter element 3 shown in FIG. 29, there is only a slight disadvantageous effect on the pressure loss.

Figure 30:
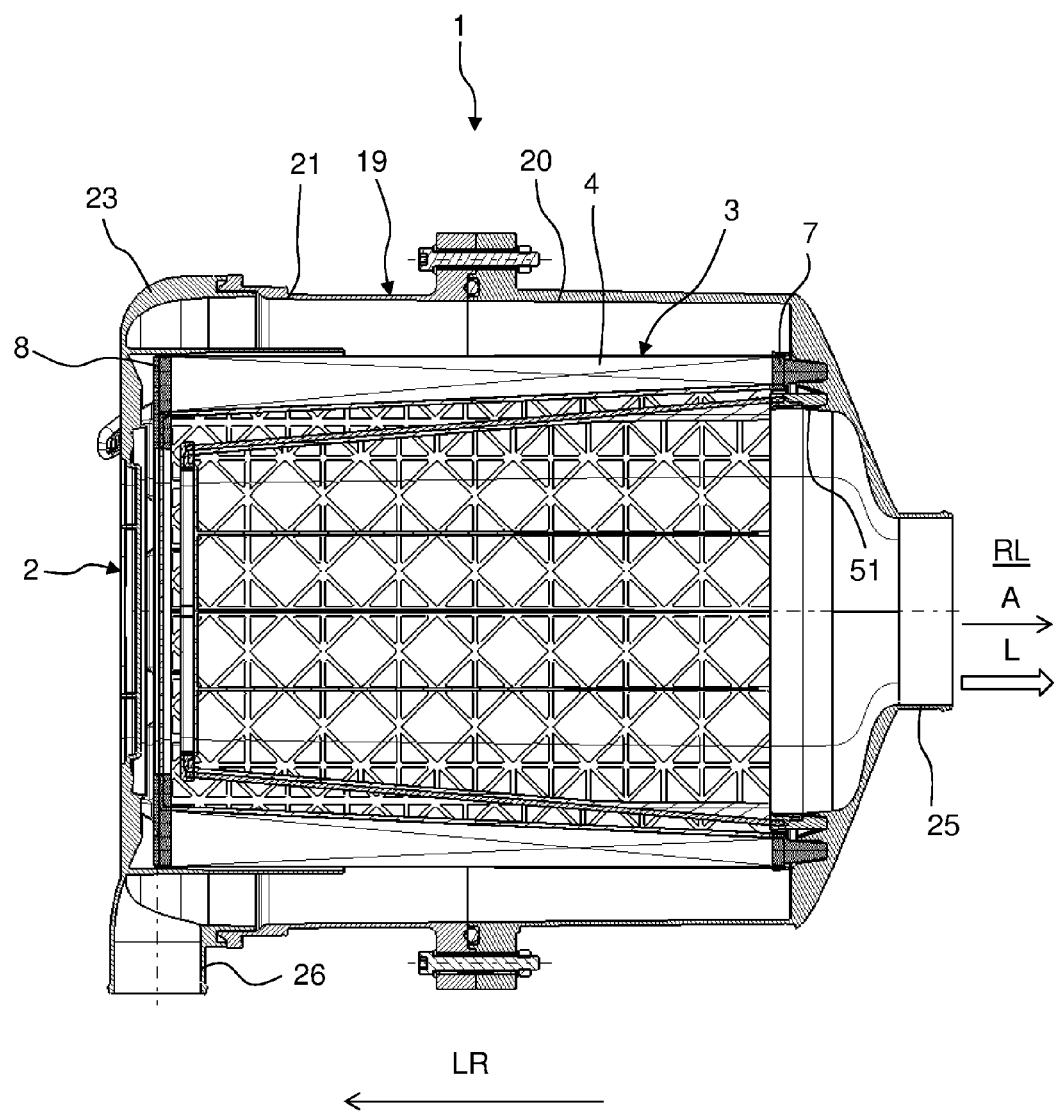
FIG. 30 shows a schematic sectional view of the filter arrangement according to FIG. 26.
Figure 31:
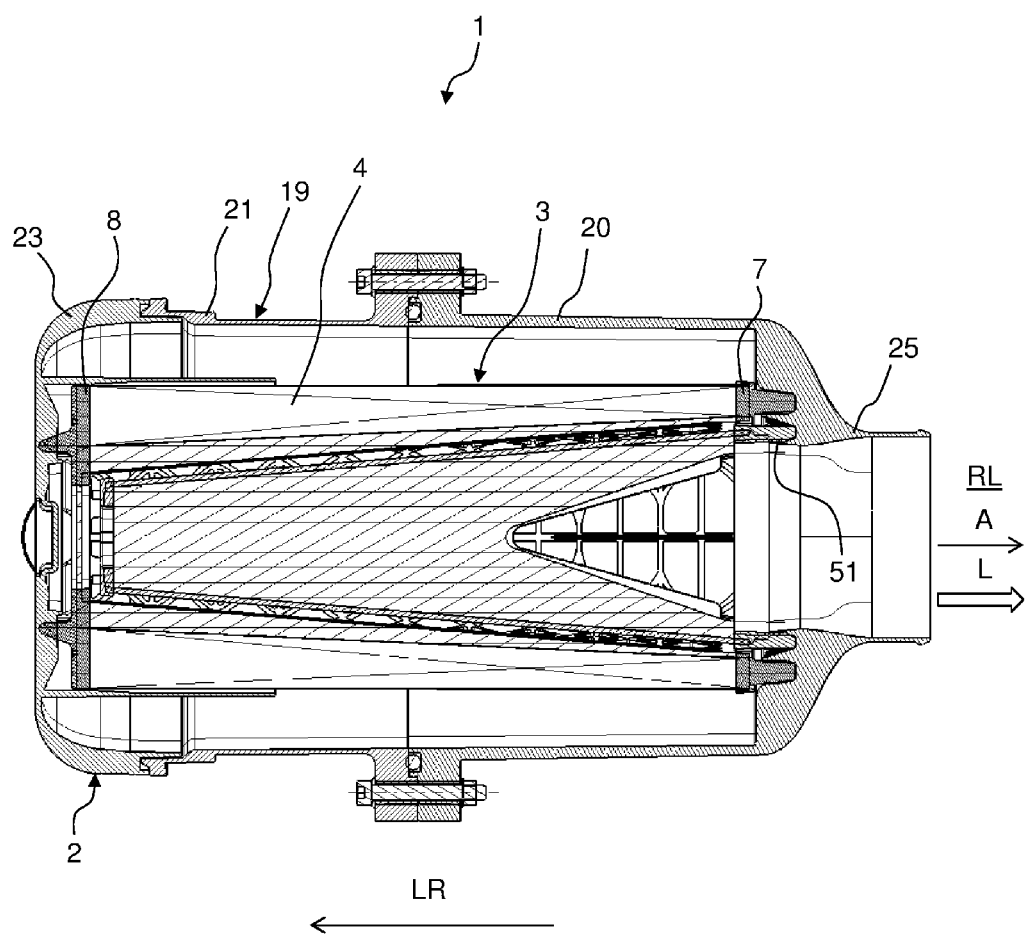
FIG. 31 shows a schematic sectional view of the filter arrangement according to FIG. 26.

As shown in FIGS. 30 and 31, the filter element 3 can still taper conically on the inside; that is, a cross section of a filter medium 4 of the filter element 3 enlarges starting from a first end plate 7 in the direction of a second end plate 8 of the filter element 3. This enables an enlarged fluid outlet opening 51 of the filter element 3 to be achieved in comparison to a filter body 4 that does not taper conically.

REFERENCE SYMBOLS 1 filter arrangement
2 filter holder or filter housing
3 filter element
4 filter body
5 center tube
6 yarn winding package
7 end plate, particularly open end plate
8 end plate, particularly closed end plate
9 front side
10 sealing device
11 receiving opening
12 incident-flow guard
13 secondary element
14 filter medium of the secondary element
15 end plate of the secondary element, particularly open
16 end plate of the secondary element, particularly closed
17 center tube of the secondary element
18 sealing device of the secondary element
19 receiving section of the filter holder
20 housing part
21 housing part
22 fastening means
23 maintenance cover
24 fluid inlet
25 fluid outlet 26 particle discharge opening
27 engagement area, particularly for the sealing device 10 of the filter element 3
28 engagement area, particularly for the sealing device 18 of the secondary element 13
29 lateral surface, particularly of the filter body 4
30 wall, particularly of the receiving section 19
31 wall, particularly for guiding the flow within the filter holder
32 arrow, particularly in the direction of circulation around the filter element 3
33 particle
34 clamping element
35 curved section, particularly with smaller curvature
36 curved section, particularly with smaller curvature
37 line
38 curved section, particularly with larger curvature
39 curved section, particularly with larger curvature
40 line, particularly short center line
41 outer contour, particularly of the sealing device 10
42 outer contour, particularly of the end plate 7 and/or 8
43 inner surface, particularly of the sealing device 10, particularly sealing surface
44 lip seal, particularly with radially interior sealing edge or sealing surface
45 lip seal, particularly with radially exterior or interior sealing edge or sealing surface
46 cavity, particularly groove between the lip seals 44, 45
47 guide member
48 incident-flow guard, particularly on the maintenance cover 23
49 transitional section, particularly at the fluid inlet 24
50 curvature
51 fluid outflow opening, particularly through the end plate 15 of the secondary element 13
270 seal contact surface of the engagement area 27
280 seal contact surface of the engagement area 28
a distance
A outflow direction
$a_{37}$ length
$a_{40}$ length
b width
br latitudinal direction
E inflow direction
h height
hr vertical direction
L fluid
LR longitudinal direction
MA center axis
M35 curvature midpoint
M36 curvature midpoint
M38 curvature midpoint
M39 curvature midpoint
RE filtered side
RO unfiltered side
R35 radius of curvature
R36 radius of curvature
R38 radius of curvature
R39 radius of curvature
u circumference
UL area of overlap
VK comparative curve
α angle of curvature

What is claimed is:

1. A filter holder (2) for a filter element (3), comprising
an oval-shaped elliptical cross section transverse to a longitudinal direction (LR) thereof;
an oval-shaped elliptical receiving section (19) arranged in an interior of the filter holder for receiving the filter element (3) such that the filter element can be flowed through radially;
wherein the oval-shaped elliptical receiving section (19) has:
a latitudinal direction (br) corresponding to a longest axis of the oval-shaped elliptical receiving section in cross section (19);
a vertical direction (hr) corresponding to a shortest axis of the oval-shaped elliptical receiving section (19) in cross section; and
wherein the oval-shaped elliptical receiving section (19) extends a greater distance in the latitudinal direction (br) than in the vertical direction (hr);
a fluid inlet (24) for allowing fluid (L) to be filtered into the filter holder (2), wherein the fluid inlet (24) is arranged on the filter holder along an inner wall (30) of the oval-shaped elliptical receiving section (19);
wherein the fluid inlet (24) is arranged such that an inflow direction (E) of the fluid (L) to be filtered is oriented in a direction perpendicular to the latitudinal direction (br) and to discharge directly in a region of the oval-shaped elliptical receiving section having a more pronounced wall curvature such that the fluid is accelerated by following the more pronounced wall curvature; and
whereby the fluid (L) to be filtered flows helically and/or tangentially around the filter element (3) that can be received in the oval-shaped elliptical receiving section (19) in order to separate particles (33) contained in the fluid (L) to be filtered on a wall (30) of the oval-shaped elliptical receiving section (19) with the aid of centrifugal force.

2. The filter holder as set forth in claim 1, wherein
the inflow direction (E) of the fluid (L) to be filtered is oriented perpendicular to a longitudinal direction (LR) of the filter element (3) that can be received in the oval-shaped elliptical receiving section (19).

3. The filter holder as set forth in claim 1, wherein
the oval-shaped elliptical receiving section (19) is configured to receive the filter element (3) into a center of the oval-shaped elliptical receiving section (19) with respect to the longitudinal direction (LR) thereof.

4. The filter holder as set forth in claim 1, wherein
the oval-shaped elliptical receiving section (19) is configured to receive the filter element (3) such that, perpendicular to the longitudinal direction (LR), a constant distance (a) is provided circumferentially around an exterior of the filter element (3) between the filter element (3) and the wall (30) of the oval-shaped elliptical receiving section (19).

5. The filter holder as set forth in claim 1, wherein
the fluid inlet (24) has an oval-shaped cross section.

6. The filter holder as set forth in claim 1, wherein
the filter holder (2) comprises
a removable maintenance cover (23) having a particle discharge opening (26).

7. The filter holder as set forth in claim 6, wherein
the maintenance cover (23) has a tubular incident-flow guard (48) in which the filter element (3) can be received at least partially.

8. A filter arrangement (1), comprising:
a filter holder (2) for a filter element (3), including:
an oval-shaped elliptical cross section transverse to a longitudinal direction (LR) thereof;

an oval-shaped elliptical receiving section (19) arranged in an interior of the filter holder for receiving the filter element (3) such that the filter element can be flowed through radially;

wherein the oval-shaped elliptical receiving section (19) has:
- a latitudinal direction (br) corresponding to a longest axis of the oval-shaped elliptical receiving section in cross section (19);
- a vertical direction (hr) corresponding to a shortest axis of the oval-shaped elliptical receiving section (19) in cross section; and
- wherein the oval-shaped elliptical receiving section (19) extends a greater distance in the latitudinal direction (br) than in the vertical direction (hr);

a fluid inlet (24) for allowing fluid (L) to be filtered into the filter holder (2), wherein the fluid inlet (24) is arranged on the filter holder along an inner wall (30) of the oval-shaped elliptical receiving section (19);
- wherein the fluid inlet (24) is arranged such that an inflow direction (E) of the fluid (L) to be filtered is oriented in a direction perpendicular to the latitudinal direction (br) and to discharge directly in a region of the oval-shaped elliptical receiving section having a more pronounced wall curvature such that the fluid is accelerated by following the more pronounced wall curvature; and whereby the fluid (L) to be filtered flows helically and/or tangentially around the filter element (3) that can be received in the oval-shaped elliptical receiving section (19) in order to separate particles (33) contained in the fluid (L) to be filtered on a wall (30) of the oval-shaped elliptical receiving section (19) with the aid of centrifugal force; and a filter element (3) received in a receiving section (19) of the filter holder (2), the filter element including:
- an oval-shaped elliptical cross section transverse to a longitudinal direction (LR) thereof;
- a first end plate (7);
- a second end plate (8);
- a filter medium (4) arranged between the first end plate (7) and the second end plate (8); and
- wherein the filter element (3) has an incident-flow guard (12) that is arranged on an oval-shaped elliptical shaped outer surface of the filter medium and extends from the first end plate towards the second end plate to circumferentially cover a portion of a longitudinal length of the oval-shaped elliptical shaped outer surface of the filter medium;

wherein a fluid inlet (24) of the filter holder (2) is arranged such that an inflow direction (E) of the fluid (L) to be filtered is oriented in the direction of a lateral surface (29) of the filter element (3) received in the receiving section (19) such that the fluid (L) to be filtered flows tangentially around the filter element (3) received in the receiving section (19) in order to separate particles (33) contained in the fluid (L) to be filtered on a wall (30) of the receiving section (19) with the aid of centrifugal force.

* * * * *